US012752750B2

(12) United States Patent
Hansson et al.

(10) Patent No.: US 12,752,750 B2
(45) Date of Patent: Oct. 6, 2026

(54) METHOD FOR DETERMINING A TRACTOR LONGITUDINAL FORCE THRESHOLD VALUE

(71) Applicant: Volvo Truck Corporation, Gothenburg (SE)

(72) Inventors: Johan Hansson, Gothenburg (SE); Daniel Möller, Gothenburg (SE); Leo Laine, Härryda (SE); Esteban Gelso, Gothenburg (SE); Robert Hjelte Ulmehag, Gothenburg (SE); Jonas Fredriksson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/878,044

(22) PCT Filed: Jun. 23, 2022

(86) PCT No.: PCT/EP2022/067204
§ 371 (c)(1),
(2) Date: Dec. 22, 2024

(87) PCT Pub. No.: WO2023/247045
PCT Pub. Date: Dec. 28, 2023

(65) Prior Publication Data
US 2025/0368169 A1 Dec. 4, 2025

(51) Int. Cl.
*B60T 8/17* (2006.01)
*B60T 8/1755* (2006.01)

(52) U.S. Cl.
CPC .......... *B60T 8/1708* (2013.01); *B60T 8/1755* (2013.01)

(58) Field of Classification Search
CPC .. B60T 8/1708; B60T 8/1755; B60T 2201/04; B60T 2230/06
See application file for complete search history.

(56) References Cited

U.S. PATENT DOCUMENTS

| | | |
|---|---|---|
| 5,411,322 A | 5/1995 | Breen |
| 5,558,350 A | 9/1996 | Kimbrough et al. |

(Continued)

FOREIGN PATENT DOCUMENTS

| | | |
|---|---|---|
| EP | 0374484 A1 | 6/1990 |
| JP | H10119739 A | 5/1998 |

(Continued)

OTHER PUBLICATIONS

International Search Report and Written Opinion of the International Searching Authority, PCT/EP2022/067204, mailed Feb. 3, 2023, 15 pages.

(Continued)

*Primary Examiner* — Jennifer M Anda
(74) *Attorney, Agent, or Firm* — Sage Patent Group

(57) ABSTRACT

A method for determining a tractor longitudinal force threshold value for a tractor longitudinal retardation force that can be imparted on a tractor of a vehicle combination including the tractor and a trailer for retarding the vehicle combination, the tractor including a set of tractor wheels adapted to engage the ground supporting the tractor, each wheel of the set of set of tractor wheels including a tire,
the method including:
- determining a tractor lateral force value,
- determining a tractor tire lateral force limit value using a tire model for determining a tire lateral force limit;
- determining a reference lateral force value using said tractor lateral force value and the tractor tire lateral force limit value;
- determining a horizontal friction force value, and
- determining the tractor longitudinal force threshold value.

17 Claims, 6 Drawing Sheets

(56) References Cited

U.S. PATENT DOCUMENTS

| | | | | | |
|---|---|---|---|---|---|
| 5,747,683 | A * | 5/1998 | Gerum | B60T 8/1708 | 701/72 |
| 6,223,114 | B1 * | 4/2001 | Boros | B60T 8/17552 | 701/72 |
| 11,787,418 | B1 * | 10/2023 | Gudeta | B60W 40/13 | 701/1 |
| 2016/0251005 | A1 * | 9/2016 | Morselli | B60T 8/17 | 701/50 |
| 2016/0318493 | A1 * | 11/2016 | Drako | B60T 8/248 | |
| 2023/0226920 | A1 * | 7/2023 | Lee | B60T 13/586 | 701/70 |
| 2024/0101099 | A1 * | 3/2024 | Laine | B60W 30/02 | |
| 2025/0368171 | A1 * | 12/2025 | Möller | B60T 8/1708 | |

FOREIGN PATENT DOCUMENTS

| | | | |
|---|---|---|---|
| WO | 2013004315 | A1 | 1/2013 |
| WO | 2022106004 | A1 | 5/2022 |

OTHER PUBLICATIONS

Ehlers, Simon F. et al., "State and Parameter Estimation in a Semitrailer for Different Loading Conditions Only Based on Trailer Signals," 2022 American Control Conference (ACC), Atlanta, United States of America, Jun. 8-10, 2022, 8 pages.

* cited by examiner

METHOD FOR DETERMINING A TRACTOR LONGITUDINAL FORCE THRESHOLD VALUE

CROSS REFERENCE TO RELATED APPLICATIONS

This application is a 35 U.S.C. § 371 national stage application of PCT International Application No. PCT/EP2022/067204 filed on Jun. 23, 2022, the disclosure and content of which is incorporated by reference herein in its entirety.

TECHNICAL FIELD

The invention relates to a method for determining a tractor longitudinal force threshold value for a tractor longitudinal retardation force that can be imparted on a tractor of a vehicle combination comprising the tractor and a trailer for retarding the vehicle combination. Moreover, the invention relates to a method for braking a vehicle combination comprising a tractor and a trailer. Additionally, the invention relates to each one of a computer program, a computer readable medium, a control unit and a vehicle combination.

The invention can be applied in heavy-duty vehicles, such as trucks, buses and construction equipment. Although the invention will be described with respect to a vehicle combination comprising a truck, the invention is not restricted to this particular vehicle combination but may also be used for vehicle combinations comprising other vehicles, such as working machines, buses or the like.

BACKGROUND

A vehicle combination generally comprises a tractor and a trailer. The tractor may comprise a tractor brake assembly and the trailer may comprise a trailer brake assembly in order to ensure that the vehicle combination can be appropriately braked.

It may be desired to brake the vehicle combination by operating the tractor brake assembly but not the trailer brake assembly for braking the vehicle combination. For instance, the tractor may comprise a tractor brake assembly for regenerative braking of the tractor and it may be desired to employ regenerative braking for the tractor solely in order to ensure that a relatively large amount of energy is regenerated when retardation of the vehicle combination is requested.

As another non-limiting example, it may be desired to use only service brakes of the tractor brake assembly when braking the vehicle combination in order to ensure that the trailer brake assembly may be inactive and thereby for instance appropriately cooled.

However, braking a vehicle combination by operating only the tractor brake assembly may be associated with certain challenges, such as an increased risk for jack-knifing or swinging out of the trailer.

As may be realized from the above, it would be desirable to gain information indicative of under which conditions a vehicle combination can be braked solely by the tractor.

SUMMARY

An object according to a first aspect of the present invention is to provide a method that can provide useful information relating to the braking of a vehicle combination.

The object is achieved by a method according to claim 1.

As such, a first aspect of the present invention relates to a method for determining a tractor longitudinal force threshold value for a tractor longitudinal retardation force that can be imparted on a tractor of a vehicle combination comprising the tractor and a trailer for retarding the vehicle combination.

The trailer has a trailer longitudinal extension in a trailer longitudinal direction, a trailer lateral extension in a trailer lateral direction and a trailer vertical extension in a trailer vertical direction, wherein the trailer longitudinal direction corresponds to an intended direction of travel of the trailer when the vehicle combination is travelling straight ahead, the trailer vertical direction corresponds to a direction of a normal to a planar surface supporting the trailer and the trailer lateral direction being perpendicular to each one of the trailer longitudinal direction and the trailer vertical direction.

The tractor has a tractor longitudinal extension in a tractor longitudinal direction, a tractor lateral extension in a tractor lateral direction and a tractor vertical extension in a tractor vertical direction, wherein the tractor longitudinal direction corresponds to an intended direction of travel of the tractor when the vehicle combination is travelling straight ahead, the tractor vertical direction corresponds to a direction of a normal to a planar surface supporting the tractor and the tractor lateral direction being perpendicular to each one of the tractor longitudinal direction and the tractor vertical direction, wherein the tractor longitudinal retardation force extends in a direction parallel to the tractor longitudinal direction. The tractor comprises a set of tractor wheels adapted to engage the ground supporting the tractor, each wheel of the set of set of tractor wheels comprising a tire.

The method comprises:

- determining a tractor lateral force value, indicative of a tractor lateral force being or predicted to be imparted on the tractor, using a tractor lateral force value determination procedure comprising:
  - obtaining a trailer mass value indicative of the current mass of the trailer;
  - obtaining a trailer operating value indicative of the current or predicted operating condition of the trailer;
  - determining an articulation angle value indicative of a current articulation angle between the tractor longitudinal direction and the trailer longitudinal direction, and
  - determining the tractor lateral force value using the trailer mass value, the trailer operating value and the articulation angle value;
- determining a tractor tire lateral force limit value using a tire model for determining a tire lateral force limit, taking at least one characteristic of the tire into account, for each wheel of at least a subset of the set of tractor wheels;
- determining a reference lateral force value using the tractor lateral force value and the tractor tire lateral force limit value;
- determining a horizontal friction force value indicative of a possible total horizontal frictional force obtainable between the ground supporting the tractor and the set of tractor wheels, and
- determining the tractor longitudinal force threshold value using the reference lateral force value and the horizontal friction force value.

The above method implies that the tractor longitudinal force threshold value can be determined with an appropriately high level of safety and accuracy since the reference lateral force value can be determined taking two entities, viz the tractor lateral force value and the tractor tire lateral force limit value, into account.

Optionally, each wheel of the set of tractor wheels has a wheel longitudinal direction being parallel to the tractor longitudinal direction when the vehicle combination is travelling straight ahead, as well as a wheel transversal direction being parallel to the tractor transversal direction when the vehicle combination is travelling straight ahead, wherein the feature of determining the tractor tire lateral force limit value comprises the following for each wheel of at least a subset of the set of tractor wheels:

- determining a wheel longitudinal velocity value indicative of a velocity in the wheel longitudinal direction of the wheel,
- determining a wheel transversal velocity value indicative of a velocity in the wheel transversal direction of the wheel,
- determining a sliding threshold value, indicative of a sliding threshold above which the wheel is expected to slide relative to the ground supporting the tractor, and
- using the wheel longitudinal velocity value, the wheel transversal velocity value and the sliding threshold value for determining a wheel specific tractor tire lateral force limit value portion forming part of the tractor tire lateral force limit value.

Optionally, wherein the wheel has a wheel vertical direction being perpendicular to each one of the wheel longitudinal direction and the wheel transversal direction and the feature of determining the sliding threshold value comprises using at least the following:

- a contact value proportional to a distance, in the wheel longitudinal direction, along which contact between the wheel and the ground supporting the tractor is determined to be established;
- a stiffness value indicative of a stiffness coefficient of the tire of the wheel;
- a vertical force value indicative of a force, in the tractor vertical direction, imparted on the wheel, and
- a friction value indicative of the friction between the wheel and the ground supporting the tractor.

Optionally, the feature of determining the tractor tire lateral force limit value further comprises the following for each wheel of at least a subset of the set of tractor wheels:

- determining a longitudinal slip value, indicative of a slip in the wheel longitudinal direction, using the wheel longitudinal velocity value and a product obtained by multiplying the effective rolling radius of the wheel by an angular velocity value indicative of a current angular velocity of the wheel.

As used herein, the term "effective rolling radius" relates to the ratio of the linear velocity of the wheel centre in the wheel longitudinal direction to the angular velocity of the wheel when no slipping occurs. Generally, the effective rolling radius is between the forced height of the wheel, viz the smallest distance in the tractor vertical direction from the ground to the centre of the wheel, and the geometric radius of the wheel. The effective rolling radius can be determined in a plurality of ways, e.g. by determining the above-mentioned ratio of the linear velocity of the wheel centre in the wheel longitudinal direction to the angular velocity of the wheel when no slipping occurs during different driving conditions. Alternatively, the effective rolling radius can be determined by determining a tire contact angle, i.e. the top angle of a triangle connecting the wheel centre and each one of a rearmost and forwardmost contact points between the tire and the ground supporting the tire and combining such a tire contact angle with the geometric radius of the wheel.

Optionally, the feature of determining the tractor tire lateral force limit value further comprises the following for each wheel of at least a subset of the set of tractor wheels:

- determining a slip angle value using the wheel longitudinal velocity value and the wheel transversal velocity value, preferably by dividing the wheel transversal velocity value by the wheel longitudinal velocity value, more preferred by calculating the arctangent for an argument corresponding to the ratio between the wheel transversal velocity value and the wheel longitudinal velocity value multiplied by minus one.

Optionally, the feature of determining the reference lateral force value using the tractor lateral force value and the tractor tire lateral force limit value comprises setting the reference lateral force to equal the one of the tractor lateral force value and the tractor tire lateral force limit value having the largest absolute value.

Optionally, the tractor lateral force value determination procedure further comprises:

- obtaining a longitudinal trailer inclination angle value indicative of the inclination angle, in the trailer longitudinal direction, of the ground supporting the trailer;
- determining a longitudinal gravity force value indicative of a longitudinal gravity force, in the trailer longitudinal direction, imparted on the trailer on the basis of at least the trailer mass value and the longitudinal trailer inclination angle value, and
- determining the tractor lateral force value using the longitudinal gravity force value The use of the above-mentioned longitudinal trailer inclination angle value implies that the tractor lateral force value may be determined with an appropriately high level of accuracy.

Optionally, the tractor lateral force value determination procedure further comprises:

- obtaining a longitudinal trailer retardation value indicative of a longitudinal trailer retardation being or predicted to be imparted on the trailer;
- determining a longitudinal inertial force value indicative of a longitudinal inertial force, in the trailer lateral direction, imparted on the trailer on the basis of at least the trailer mass value and the longitudinal trailer retardation value, and
- determining the tractor lateral force value using the longitudinal inertial force value.

The use of the above-mentioned longitudinal trailer retardation value implies that the tractor lateral force value may be determined with an appropriately high level of accuracy.

Optionally, the tractor lateral force value determination procedure further comprises:

- determining a lateral centrifugal force value indicative of a centrifugal force, in the trailer lateral direction, imparted on the trailer on the basis of at least the trailer mass value, and
- determining the tractor lateral force value using the lateral centrifugal force value.

Optionally, the tractor lateral force value determination procedure further comprises:

- obtaining a lateral inclination angle value indicative of the inclination angle, in the trailer lateral direction, of the ground supporting the trailer;
- determining a lateral gravity force value indicative of a lateral gravity force, in the trailer lateral direction, imparted on the trailer on the basis of at least the trailer mass value and the lateral inclination angle value, and determining the tractor lateral force value using the lateral gravity force value.

Optionally, the tractor lateral force value determination procedure further comprises:

multiplying each force value indicative of a force, in the trailer longitudinal direction, with the sine of the articulation angle value.

Optionally, the tractor lateral force value determination procedure further comprises:

multiplying each force value indicative of a force, in the trailer lateral direction, with the cosine of the articulation angle value.

Optionally, the tractor comprises a set of wheel axles. The set of wheel axles comprises at least one wheel axle and each wheel axle is connected to individual wheels of the set of tractor wheels. The method comprises performing the following for each wheel axle in the set of wheel axles:

on the basis of the trailer lateral force value, determining a trailer axle lateral force value indicative of a trailer lateral force being or predicted to be imparted on the wheel axle;

determining a tractor axle lateral force limit value using a tire model for determining a tire lateral force limit, taking at least one characteristic of the tire into account, for at least one, preferably each of, the wheel or wheels connected to the wheel axle;

determining a reference axle lateral force value using the trailer axle lateral force value and the tractor axle lateral force limit value;

determining a horizontal axle friction force value indicative of a possible total horizontal frictional force obtainable between the ground supporting the tractor and at least one, preferably each of, the wheel or wheels connected to the wheel axle;

determining a tractor axle longitudinal force threshold value using the reference axle lateral force value and the horizontal axle friction force value, and summarizing the axle tractor longitudinal force threshold value for each wheel axle in the set of wheel axles in order to obtain the tractor longitudinal force threshold value.

Optionally, the step of determining the trailer axle lateral force value indicative of a trailer lateral force being or predicted to be imparted on the wheel axle on the on the basis of the trailer lateral force value comprises using a moment equilibrium equation using the following inputs:

the trailer lateral force value;

a distance, in the tractor longitudinal direction, from each wheel axle to the centre of gravity of the tractor, and a distance, in the tractor longitudinal direction, from the connection point to the centre of gravity of the tractor.

Optionally, the method comprises performing the following for at least a plurality, preferably for each one, of the wheels of the set of tractor wheels:

on the basis of the trailer lateral force value, determining a trailer wheel lateral force value indicative of a trailer lateral force being or predicted to be imparted on the wheel;

determining a tractor wheel lateral force limit value using a tire model for determining a tire lateral force limit, taking at least one characteristic of the tire into account, for the wheel;

determining a reference wheel lateral force value using the trailer wheel lateral force value and the tractor wheel lateral force limit value;

determining a horizontal wheel friction force value indicative of a possible total horizontal frictional force obtainable between the ground supporting the tractor and at least one, preferably each of, the wheel or wheels connected to the wheel;

determining a tractor wheel longitudinal force threshold value using the reference wheel lateral force value and the horizontal wheel friction force value, and summarizing the wheel tractor longitudinal force threshold value for each wheel in the set of wheel wheels in order to obtain the tractor longitudinal force threshold value.

Optionally, the step of determining the trailer wheel lateral force value indicative of a trailer lateral force being or predicted to be imparted on the wheel on the on the basis of the trailer lateral force value comprises using a moment equilibrium equation using the following inputs:

the trailer lateral force value;

a distance, in the tractor longitudinal direction, from each one of a plurality of wheels, preferably from each wheel, in the of the set of tractor wheels to the centre of gravity of the tractor, and a distance, in the tractor longitudinal direction, from the connection point to the centre of gravity of the tractor.

A second aspect of the present invention relates to a method for braking a vehicle combination comprising a tractor and a trailer, the tractor comprises a tractor brake assembly for regenerative braking of the tractor and the trailer comprises a trailer brake assembly for braking the trailer, the method comprising:

determining a force tractor longitudinal force threshold value using the method according to any one of the preceding claims:

operating the tractor brake assembly so as to provide a braking force being smaller than or equal to the force tractor longitudinal force threshold value.

Optionally, the method further comprises:

obtaining a retardation request value indicative of a requested retardation of the vehicle combination;

determining a requested braking force to be imparted on the vehicle combination on the basis of the retardation request values, and in response to the braking force being smaller than or equal to the force tractor longitudinal force threshold value, operating the tractor brake assembly but not the trailer brake assembly for braking the vehicle combination.

Optionally, determining a requested braking force to be imparted on the vehicle combination on the basis of the retardation request value further comprises obtaining a tractor mass value indicative of the current mass of the tractor and a trailer mass value indicative of the current mass of the trailer.

Optionally, determining a requested braking force to be imparted on the vehicle combination on the basis of the retardation request value further comprises determining a longitudinal trailer inclination angle value indicative of the inclination angle, in the trailer longitudinal direction, of the ground supporting the trailer.

Optionally, determining a requested braking force to be imparted on the vehicle combination on the basis of the retardation request value further comprises determining a longitudinal tractor inclination angle value indicative of the inclination angle, in the tractor longitudinal direction, of the ground supporting the tractor.

A third aspect of the present invention relates to a computer program comprising program code means for performing the method of any one of the first and second aspects of the present invention when the program is run on a computer.

A fourth aspect of the present invention relates to a computer readable medium carrying a computer program comprising program code means for performing the method of any one of the first and second aspects of the present invention when the program product is run on a computer.

A fifth aspect of the present invention relates to a control unit configured to perform the method of any one of the first and second aspects of the present invention.

A sixth aspect of the present invention relates to a vehicle combination comprising a tractor, a trailer and a control unit according to the fifth aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3*a* is a schematic side view of a wheel;

DETAILED DESCRIPTION OF EXAMPLE EMBODIMENTS OF THE INVENTION

Figure 1:
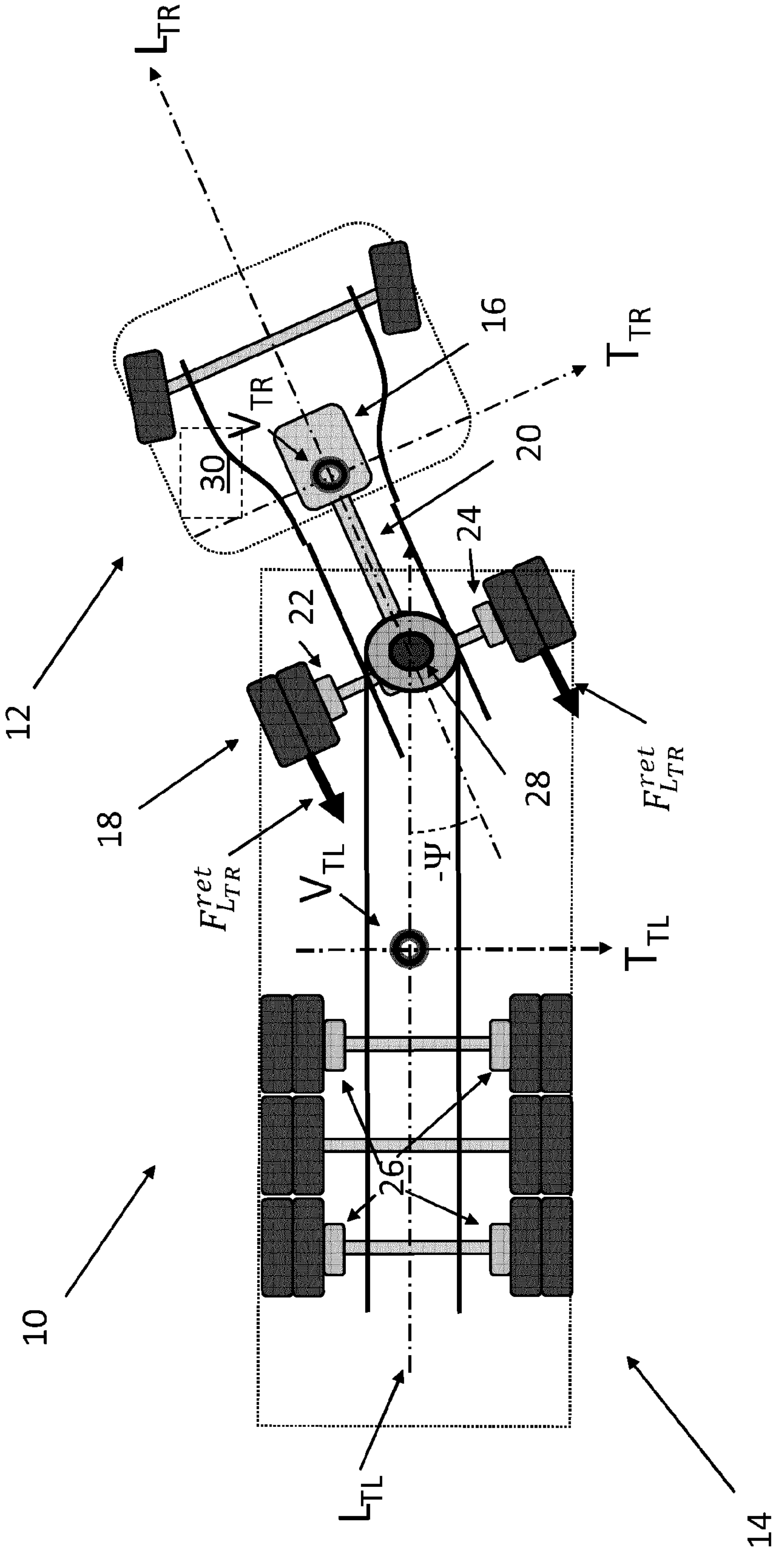
FIG. 1 is a schematic plan view of a vehicle combination.

FIG. 1 is a schematic plan view of a vehicle combination 10 comprising a tractor 12 and a trailer 14. Purely by way of example, and as indicated in FIG. 1, the tractor 12 may comprise a propulsion assembly 16 for propelling the tractor 12 and consequently the vehicle combination 10. As a non-limiting example, the propulsion assembly 16 may comprise an electric motor. Moreover, as indicated in FIG. 1, the tractor 12 comprises a set of tractor wheels 18 adapted to engage the ground supporting the tractor 12. Each wheel of the set of tractor wheels 18 comprises a tire. In the FIG. 1 embodiment of the vehicle combination 10, the tractor 12 comprises a pair of double rear wheels and a pair of forward wheels. However, it is of course envisaged that other embodiments of the vehicle combination 10 may comprise a tractor with another implementation of the set of tractor wheels 18.

Moreover, in the FIG. 1 embodiment, the propulsion assembly 16 is connected to the pair of double rear wheels via an arrangement comprising a shaft 20. Moreover, it is also contemplated that the propulsion assembly 16 may comprise one or more electric motors each one of which being arranged at the hub of a wheel, of the tractor 12.

As indicated in FIG. 1, the trailer 14 has a trailer longitudinal extension in a trailer longitudinal direction $L_{TL}$, a trailer lateral extension in a trailer lateral direction $T_{TL}$ and a trailer vertical extension in a trailer vertical direction $V_{TL}$. The trailer longitudinal direction $L_{TL}$ corresponds to an intended direction of travel of the trailer 14 when the vehicle combination 10 is travelling straight ahead, the trailer vertical direction $V_{TL}$ corresponds to a direction of a normal to a planar surface supporting the trailer 14 and the trailer lateral direction $T_{TL}$ is perpendicular to each one of the trailer longitudinal direction $L_{TL}$ and the trailer vertical direction $V_{TL}$.

In a similar vein, and as also indicated in FIG. 1, the tractor 12 has a tractor longitudinal extension in a tractor longitudinal direction $L_{TR}$, a tractor lateral extension in a tractor lateral direction $T_{TR}$ and a tractor vertical extension in a tractor vertical direction $V_{TR}$. The tractor longitudinal direction $L_{TR}$ corresponds to an intended direction of travel of the tractor 12 when the vehicle combination 10 is travelling straight ahead, the tractor vertical direction $V_{TR}$ corresponds to a direction of a normal to a planar surface supporting the tractor 12 and the tractor lateral direction $T_{TR}$ is perpendicular to each one of the tractor longitudinal direction $L_{TR}$ and the tractor vertical direction $V_{TR}$.

Moreover, as indicated in FIG. 1, the tractor 12 may comprise a tractor brake assembly for regenerative braking of the tractor 12. As a non-limiting example, the propulsion assembly 16 may be used for regenerative braking of the tractor 12 and may thus form part of, or even constitute, the tractor brake assembly for regenerative braking of the tractor 12. Thus, when the propulsion assembly 16 is implemented as an electric machine for instance, such an electric machine may function as a generator and generate electric energy to be stored in an electric storage assembly (not shown), such as a battery (not shown). However, it is also contemplated that the tractor brake assembly for regenerative braking of the tractor 12 may comprise, or even be constituted by, one or more electric hub machines 22, 24, each one of which may operate as a generator and generate electric energy to be stored in an electric storage assembly (not shown), such as a battery (not shown).

Moreover, other implementations of the tractor 12 may comprise a tractor brake assembly for braking of the tractor 12 without necessarily having a regeneration capability. For instance, such implementations may comprise one or more service brakes (not shown in FIG. 1).

Irrespective of the implementation the tractor brake assembly is adapted to generate a tractor longitudinal retardation force $$F_{L_{TR}}^{ret}$$

extending in a direction parallel to the tractor longitudinal direction $L_{TR}$.

Moreover, the trailer 14 may comprise a trailer brake assembly 26 for braking the trailer. The trailer brake assembly 26 may comprise one or more service brakes, one or more electric machines for regenerative braking, or any combination thereof.

Furthermore, as indicated in FIG. 1, the trailer 14 is pivotally connected to the trailer 12 via a connection point 28. Such a connection point 28 may for instance be implemented as a so called fifth wheel. Thus, the trailer 14 is connected to the tractor 12 such that an articulation angle $\Psi$ may be formed between the tractor longitudinal direction $L_{TR}$ and the trailer longitudinal direction $L_{TL}$. Moreover, the above-mentioned articulation angle $\Psi$ may vary, preferably in a stepless manner, depending on for instance the operating condition of the vehicle combination 10. The articulation angle $\Psi$ is indicated with a minus sign in FIG. 1 thereby implying that a negative articulation angle $\Psi$ is assumed in the FIG. 1 condition.

Additionally, FIG. 1 illustrates that the vehicle combination 10 may comprise a control unit 30 configured to perform the method according to the present invention. In the FIG. 1 embodiment, the control unit 30 is located in the tractor 12 although other positions of the control unit 30 are also conceivable.

Figure 2:
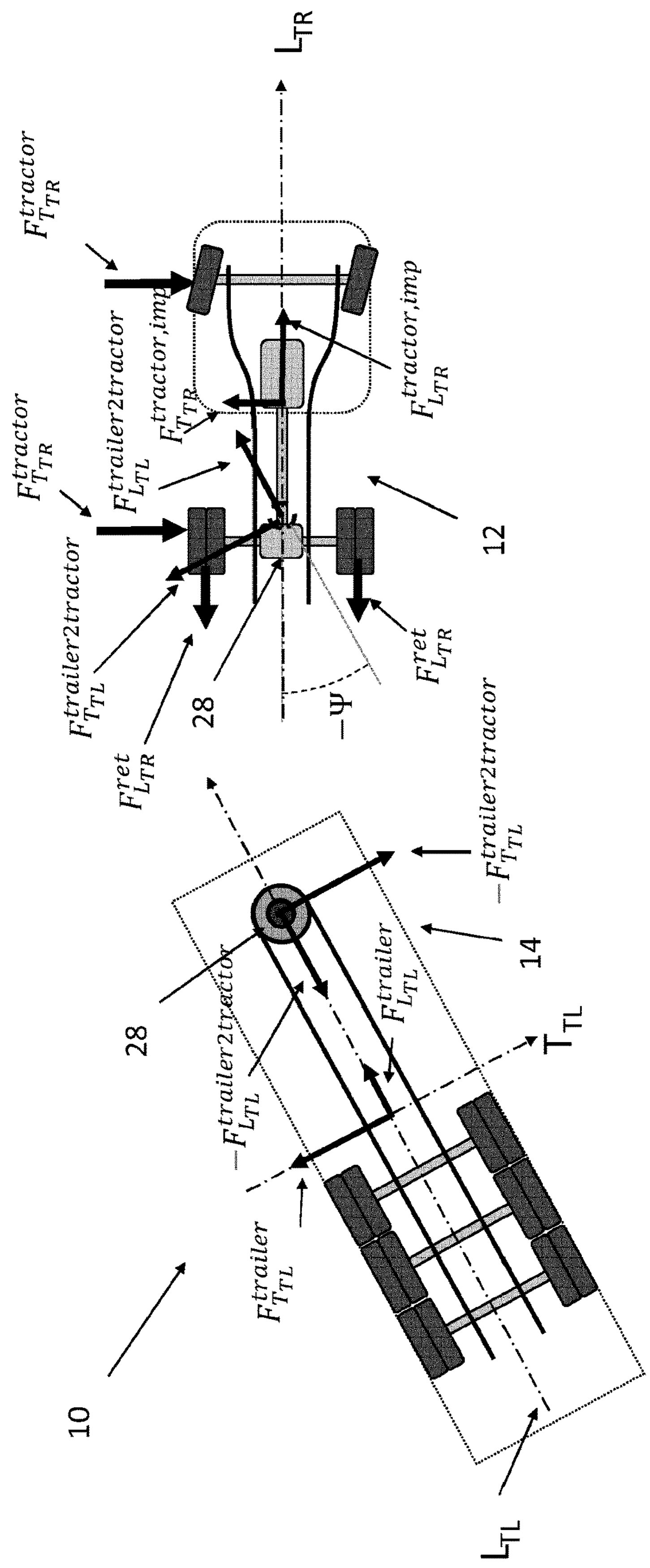
FIG. 2 is a schematic plan view of a vehicle combination.

FIG. 2 is a schematic plan view of a vehicle combination 10 being similar to the FIG. 1 vehicle combination 10. In FIG. 2, the trailer 12 and the tractor 14 are illustrated at a distance from each other in order to elucidate the forces acting between the tractor 12 and the trailer 14. However, it should be noted that the coupling forces between the tractor 12 and trailer 14 occur when the trailer 14 is connected to the tractor 12 via the connection point 28.

As may be realized from FIG. 2, during driving of the vehicle combination 10, the trailer will be imparted a trailer longitudinal force $$F_{L_{TL}}^{trailer},$$

in the trailer longitudinal direction $L_{TL}$, and a trailer lateral force $$F_{T_{TL}}^{trailer},$$

in the trailer lateral direction $T_{TL}$. Further details of these forces will be presented hereinbelow.

The above-mentioned forces will result in connection forces $$F_{L_{TL}}^{trailer2tractor}, F_{T_{TL}}^{trailer2tractor}$$

in the trailer longitudinal direction $L_{TL}$ and the trailer lateral direction $T_{TL}$, respectively, between the tractor 12 and the trailer 14. It should be noted that the connection forces $$F_{L_{TL}}^{trailer2tractor}, F_{T_{TL}}^{trailer2tractor}$$

need not necessarily fully correspond to the trailer longitudinal force $$F_{L_{TL}}^{trailer}$$

and the trailer lateral force $$F_{T_{TL}}^{trailer},$$

respectively. This is since at least a portion of the trailer longitudinal force $$F_{L_{TL}}^{trailer}$$

and/or the trailer lateral force $$F_{T_{TL}}^{trailer}$$

may be accommodated by for instance the ground engaging members, such as the wheels, of the trailer 14.

In FIG. 2, the above-mentioned connection forces are presented in relation to the tractor 12 as well as to the trailer 14. Moreover, as indicated in FIG. 2, the connection forces $$F_{L_{TL}}^{trailer2tractor}, F_{T_{TL}}^{trailer2tractor}$$

are related to the trailer longitudal direction $L_{TL}$ and the trailer lateral direction $T_{TL}$, respectively. Consequently, in order to transform the connection forces $$F_{L_{TL}}^{trailer2tractor}, F_{T_{TL}}^{trailer2tractor}$$

to the tractor longitudinal direction $L_{TR}$ and the tractor lateral direction $T_{TR}$, respectively, the current articulation angle $\Psi$ may be taken into account.

Moreover, a tractor longitudinal retardation force $$F_{L_{TR}}^{ret}$$

imparted on the tractor 12 is illustrated in FIG. 2. Furthermore, a tractor lateral force $$F_{T_{TR}}^{tractor},$$

viz a force in the tractor lateral direction $T_{TR}$ imparted on the tractor 12 via the wheels thereof, is indicated in FIG. 2.

The total horizontal forces that can be imparted on the tractor 12 via the set of tractor wheels 18, i.e. from the contact between the wheels and the ground supporting the tractor 12, is limited by a total horizontal frictional force $$F_{total}^{tractor}$$

that is obtainable between the ground supporting the tractor and the set of tractor wheels 18.

Purely by way of example, the total horizontal frictional force may be determined using the weight $$F_{V_{TR}}^{tractor}$$

of the tractor 12, viz the sum of the forces in the tractor vertical direction $V_{TR}$ imparted on the set of tractor wheels 18 from the ground supporting the tractor. The weight $$F_{V_{TR}}^{tractor}$$

may be determined by multiplying the total tractor mass $m^{tractor}$ by an acceleration value g corresponding to acceleration due to gravity. Moreover, in order to determine the total horizontal frictional force, a friction value $\mu$, indicative of the friction between the set of tractor wheels 18 and the ground supporting the tractor 12 may be used.

Such a friction value μ may be determined using any known procedure, such as using a sensor (such as a camera) for monitoring the condition of the ground onto which the tractor 12 is travelling and/or by using a brush model or using a slip value associated with the set of tractor wheels 18.

As such, the total horizontal frictional force $$F_{total}^{tractor}$$

may be determined in accordance with the following:

$$F_{total}^{tractor} = F_{V_{TR}}^{tractor} \cdot \mu \quad \text{Eq. 1}$$

However, it should be noted that the total horizontal frictional force $$F_{total}^{tractor}$$

may be determined in accordance with other procedures as well. Purely by way of example, if the individual friction value pi, indicative of the friction between the one wheel of the tractor 12 and the ground supporting the tractor 12, is taken into account, the total horizontal frictional force $$F_{total}^{tractor}$$

may determined in accordance with the following, in which M is the number of wheels in the set of tractor wheels 18:

$$F_{total}^{tractor} = \sum_{i=1}^{M} F_{V_{TR}}^{tractor,i} \cdot \mu_i \quad \text{Eq. 2}$$

where:

$$F_{V_{TR}}^{tractor,i}$$

is the force in the tractor vertical direction $V_{TR}$ imparted on the i:th wheel of the set of tractor wheels 18 from the ground supporting the tractor 12, and $\mu_i$ is a friction value indicative of the friction between the i:th wheel of the set of tractor wheels 18 and the ground supporting the tractor 12.

Purely by way of example, the force in the tractor vertical direction $V_{TR}$ imparted on the i:th wheel of the set of tractor wheels 18 from the ground supporting the tractor 12 may be determined using information from e.g. a wheel suspension arrangement (not shown) of the tractor 12.

As a further alternative, Eq. 3 hereinabove may also be employed for each wheel member axle of the tractor 12.

Irrespective of how the total horizontal frictional force $$F_{total}^{tractor}$$

is determined, the following condition should be met in order to avoid slipping and/or sliding of the set of tractor wheels 18:

$$(F_{total}^{tractor})^2 = (F_{L_{TR}}^{ret})^2 + (F_{T_{TR}}^{tractor,ground})^2 \quad \text{Eq. 3}$$

For the sake of simplicity, Eq. 3 hereinabove relates to the total forces of the tractor 12. However, it should be noted that Eq. 3 can be expanded to wheel axles or even wheels of the tractor 12.

As such, though purely by way of example, Eq. 3 can be expanded to a tractor 12 comprising a set of wheel axles, wherein the set of wheel axles comprises at least one axle and wherein each wheel axle is connected to individual wheels of the tractor 12. Assuming that the tractor comprises N axles, Eq. 3 can be expanded in accordance with the following:

$$\sum_{i=1}^{N} (F_{total}^{tractor,i})^2 = \sum_{i=1}^{N} (F_{L_{TR}}^{ret,i})^2 + \sum_{i=1}^{N} (F_{T_{TR}}^{tractor,ground,i})^2 \quad \text{Eq. 4}$$

Wherein the index i indicates the i:th wheel axle.

In a similar vein, though purely by way of example, Eq. 3 can be expanded to a tractor 12 to each wheel of the set of tractor wheels 18. Assuming that the set of tractor wheels 18 comprises M wheels, Eq. 3 can be expanded in accordance with the following:

$$\sum_{j=1}^{M} (F_{total}^{tractor,j})^2 = \sum_{j=1}^{M} (F_{L_{TR}}^{ret,j})^2 + \sum_{j=1}^{M} (F_{T_{TR}}^{tractor,ground,j})^2 \quad \text{Eq. 5}$$

Wherein the index j indicates the j:th wheel.

For the sake of brevity, the below examples are mainly based on Eq. 3 hereinabove. However, it should be noted that the below examples can be expanded in a straightforward manner to each one of Eq. 4 and Eq. 5, respectively.

As such, using Eq. 3 as an example, a maximum value of the tractor longitudinal retardation force $$F_{L_{TR}}^{ret,threshold},$$

which value hereinafter will be referred to as a tractor longitudinal force threshold value, may be determined in accordance with the following:

$$F_{L_{TR}}^{ret,threshold} = \sqrt{(F_{total}^{tractor})^2 - (F_{T_{TR}}^{tractor,ground,i})^2} \quad \text{Eq. 6}$$

Again, the total horizontal frictional force $$F_{total}^{tractor}$$

can for instance be determined in accordance with any one of the procedures mentioned hereinabove.

Although the above determination of the tractor longitudinal force threshold value $$F_{L_{TR}}^{ret}$$

is a correct representation of the kinetics of vehicle combination 10, the inventors of the present invention have realized that the tractor longitudinal force threshold value $$F_{L_{TR}}^{ret}$$

can be determined in an alternative manner in order to arrive at a tractor longitudinal force threshold value $$F_{L_{TR}}^{ret}$$

implying an appropriately safe operation of the vehicle combination 10.

In particular, the inventors have realized that the tractor lateral force $$F_{T_{TR}}^{tractor,\,ground}$$

in e.g. Eq. 6 hereinabove may be modified in order to take not only the kinetic conditions of the vehicle combination 10, but also the characteristics of the tires of each wheel of at least a subset of the set of tractor wheels 18, into account. As such, Eq. 6 may be reformulated in accordance with the following:

$$F_{L_{TR}}^{ret,\,threshold} = \sqrt{(F_{total}^{tractor})^2 - \left(F_{T_{TR}}^{tractor,\,ref}\right)^2} \quad \text{Eq. 7}$$

wherein $$F_{T_{TR}}^{tractor,\,ref} = f\left(F_{T_{TR}}^{tractor}, F_{T_{TR}}^{tire}\right) \quad \text{Eq. 8}$$

and:

$$F_{T_{TR}}^{tractor}$$

is a tractor lateral force value indicative of a tractor lateral force being or predicted to be imparted on the tractor 12, and $$F_{T_{TR}}^{tire}$$

is a tractor tire lateral force limit value determined taking the characteristics of the tires of each wheel of at least a subset of the set of tractor wheels 18 into account.

Although the invention is presented hereinabove in Eq. 8 is a modification of Eq. 3, it should be noted that similar modifications can of course be made to each one of Eq. 4 and Eq. 5.

As such, the method according to the first aspect of the present invention comprises:

determining a tractor lateral force value $$F_{T_{TR}}^{tractor},$$

indicative or a tractor lateral force being or predicted to be imparted on the tractor 12, using a tractor lateral force value determination procedure comprising:

- obtaining a trailer mass value $m^{trailer}$ indicative of the current mass of the trailer 14;
- obtaining a trailer operating value indicative of the current or predicted operating condition of the trailer 14;
- determining an articulation angle value $\Psi$ indicative of a current articulation angle between the tractor longitudinal direction $L_{TR}$ and the trailer longitudinal direction $L_{TL}$, and
- determining the tractor lateral force value $$F_{T_{TR}}^{tractor,ground}$$

using the trailer mass value $m^{trailer}$, the trailer operating value and the articulation angle value $\Psi$.

Moreover, the method according to the first aspect of the present invention comprises determining a tractor tire lateral force limit value $$F_{T_{TR}}^{tire}$$

usually a tire model for determining a tire lateral force limit, taking at least one characteristic of the tire into account, for each wheel of at least a subset of the set of tractor wheels 18. Implementations of the tire model will be presented hereinbelow.

Furthermore, the method comprises determining a reference lateral force value $$F_{T_{TR}}^{tractor,ref}$$

(see Eq. 8 hereinabove) using the tractor lateral force value $$F_{T_{TR}}^{tractor}$$

and the tractor tire lateral force limit value $$F_{T_{TR}}^{tire}.$$

Additionally, as has been exemplified hereinabove with reference to each one of Eq. 1 and Eq. 2, the method comprises determining a horizontal friction force value $$F_{total}^{tractor}$$

indicative of a possible total horizontal frictional force obtainable between the ground supporting the tractor 12 and the set of tractor wheels 18.

Further, the method comprises determining the tractor longitudinal force threshold value $$F_{L_{TR}}^{ret,threshold}$$

using the reference lateral force value $$F_{T_{TR}}^{tractor,ref}$$

and the horizontal friction force value $$F_{total}^{tractor}.$$

The reference lateral force value $$F_{T_{TR}}^{tractor,ref}$$

may be determined in a plurality of different ways, for instance using any combination of the tractor lateral force value $$F_{T_{TR}}^{tractor}$$

and the tractor tire lateral force limit value $$F_{T_{TR}}^{tire},$$

such as $$F_{T_{TR}}^{tractor,ref} = aF_{T_{TR}}^{tractor} + bF_{T_{TR}}^{tire}$$

wherein a and b are predetermined coefficients. However, as a non-limiting example, the feature of determining the reference lateral force value $$F_{T_{TR}}^{tractor,ref}$$

using the tractor lateral force value $$F_{T_{TR}}^{tractor}$$

and the tractor tire lateral force limit value $$F_{T_{TR}}^{tire}$$

may compromise setting the reference lateral force $$F_{T_{TR}}^{tractor,ref}$$

to equal the one of the tractor lateral force value and the tractor tire lateral force limit value having the largest absolute value. As such, the reference lateral force value $$F_{T_{TR}}^{tractor,ref}$$

may be determined in accordance with the following:

$$F_{T_{TR}}^{tractor,ref} = \max\left(\left|F_{T_{TR}}^{tractor}\right|, \left|F_{T_{TR}}^{tire}\right|\right) \quad \text{Eq. 9}$$

Figure 3B:
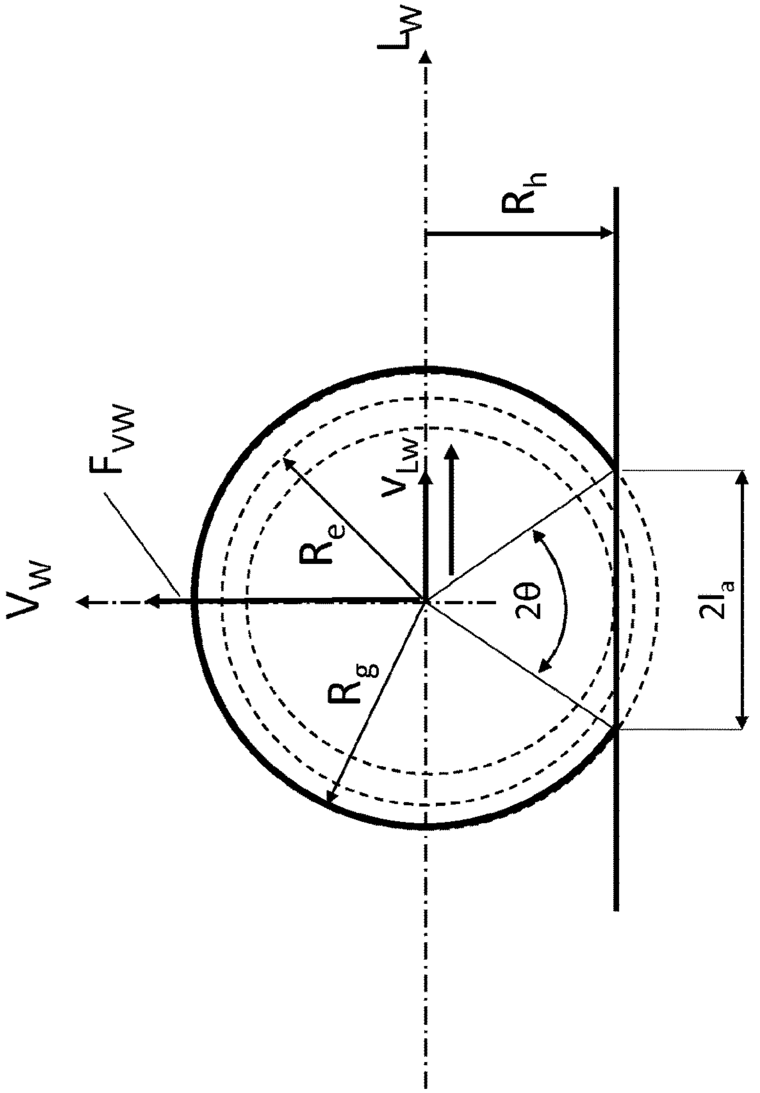
FIG. 3*a* is a schematic plan view of a wheel.
Figure 3A:
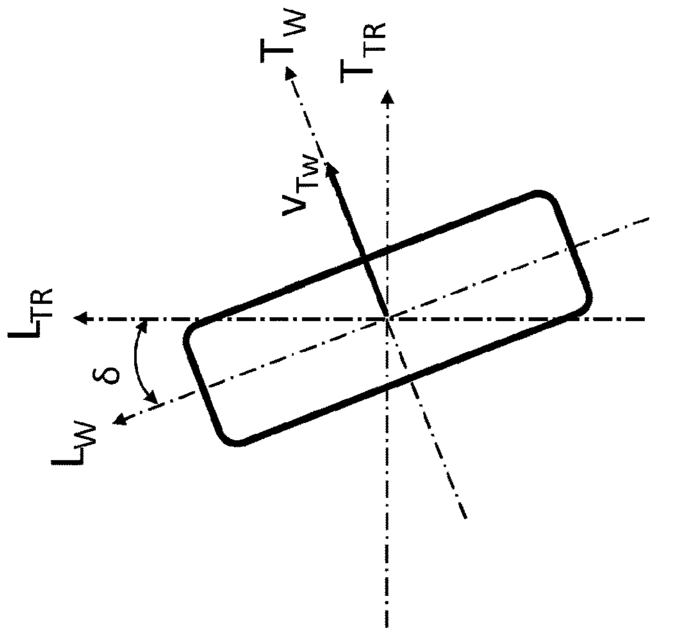

Non-limiting examples of the determination of the tractor tire lateral force limit value $$F_{T_{TR}}^{tire}$$

will be presented hereinbelow with references to FIG. 3*a* and FIG. 3*b*, respectively. FIG. 3*a* is a plan view and FIG. 3*b* is a side view of a wheel forming part of the set of tractor wheels 18. It should be noted that the below presentation is applicable for each one of the wheels of the set of tractor wheels 18.

As may be gleaned from FIG. 3*a*, each wheel of the set of tractor wheels 18 has a wheel longitudinal direction $L_W$ being parallel to the tractor longitudinal direction $L_{TR}$ when the vehicle combination (not shown in FIG. 3*a*) is travelling straight ahead. In a similar vein, each wheel of the set of tractor wheels 18 has a wheel transversal direction $T_W$ being parallel to the tractor transversal direction $L_{TR}$ when the vehicle combination (not shown in FIG. 3*a*) is travelling straight ahead. FIG. 3*a* illustrates an example with a steerable wheel with a steering angle $\delta$ between the wheel longitudinal direction $L_W$ and the tractor longitudinal direction $L_{TR}$. Purely by way of example, the steering angle $\delta$ may be detected by a steering angle sensor (not shown) or by a steering wheel sensor (not shown) detecting the position of a steering wheel (not shown). For non-steerable wheels, the steering angle $\delta$ is constant and may be zero.

As a non-limiting example, the feature of determining the tractor tire lateral force limit value may comprises the following procedure for each wheel of at least a subset of the set of tractor wheels 18:

- determining a wheel longitudinal velocity value $v_{LW}$ (see FIG. 3*b*) indicative of a velocity in the wheel longitudinal direction $L_W$ of the wheel;
- determining a wheel transversal velocity value $v_{TW}$ (see FIG. 3*a*) indicative of a velocity in the wheel transversal direction $L_W$ of the wheel,
- determining a sliding threshold value $\sigma_{sl}$, indicative of a sliding threshold above which the wheel is expected to slide relative to the ground supporting the tractor 12, and
- using the wheel longitudinal velocity value $v_{LW}$, the wheel transversal velocity value $v_{TW}$ and the sliding threshold value $\sigma_{sl}$ for determining a wheel specific tractor tire lateral force limit value portion forming part of the tractor tire lateral force limit value.

An exemplary implementation of the above will be presented hereinbelow. As a non-limiting example, a slip value $\sigma_{LW}$, $\sigma_{TW}$ in each one of the wheel longitudinal direction $L_W$ and the wheel transversal direction $T_W$ may be determined using function that has each one of the wheel longitudinal velocity value $v_{LW}$ and the wheel transversal velocity value $v_{TW}$ as inputs, in accordance with the following:

$$\sigma_{LW} = g(v_{LW}, v_{TW}) \text{ and} \quad \text{Eq. 10}$$

$$\sigma_{TW} = h((v_{LW}, v_{TW}). \quad \text{Eq. 11}$$

From the above slip values $\sigma_{LW}$, $\sigma_{TW}$, it is possible to determine a slip magnitude in accordance with the following:

$$\sigma = \sqrt{\sigma_{LW}^2 + \sigma_{TW}^2}. \quad \text{Eq. 12}$$

Moreover, the above exemplary implementation may use the force $F_{VW}$ in the wheel vertical direction $V_W$ (see FIG. 3*b*) imparted on the wheel. The wheel vertical direction $V_W$ is perpendicular to each one of the wheel longitudinal direction $L_W$ and the wheel transversal direction $L_W$. Purely by way of example, the wheel vertical direction $V_W$ may be parallel to the tractor vertical direction $V_{TR}$. As a non-limiting example, the force $F_{VW}$ in the wheel vertical direction $V_W$ may be determined using information from e.g. a wheel suspension system (not shown) associated with the wheel.

Using the above information, the maximum forces $F_{LW}$, $F_{TW}$ in the wheel longitudinal direction $L_W$ and the wheel transversal direction $T_W$, respectively, may be determined in accordance with the following:

$$F = \mu F_{VW}\left(3\frac{\sigma}{\sigma_{sl}} - 3\left(\frac{\sigma}{\sigma_{sl}}\right)^2 + \left(\frac{\sigma}{\sigma_{sl}}\right)^3\right) \text{ for } \sigma \le \sigma_{sl} \quad \text{Eq. 13}$$

$$F = \mu F_{VW} \text{ for } \sigma > \sigma_{sl} \quad \text{Eq. 14}$$

$$F_{LW} = F\frac{\sigma_{LW}}{\sigma_{sl}} \quad \text{Eq. 15}$$

$$F_{TW} = F\frac{\sigma_{TW}}{\sigma_{sl}} \quad \text{Eq. 16}$$

The above identified maximum forces $F_{LW}$, $F_{TW}$ in the wheel longitudinal direction $L_W$ and the wheel transversal direction $T_W$, respectively, may thereafter be transformed to the tractor longitudinal direction $L_{TR}$ and the tractor lateral direction $T_{TR}$, respectively, using the steering angle $\delta$ between the wheel longitudinal direction $L_W$ and the tractor longitudinal direction $L_{TR}$. In particular, the tractor tire lateral force limit value $F_{TTR}$ in the tractor lateral direction $T_{TR}$, related to the wheel currently assessed, may be determined in accordance with the following:

$$F_{TTR} = F_{LW} \cdot \sin(\delta) + F_{TW} \cdot \cos(\delta) \quad \text{Eq. 17}$$

As may be realized from the above, Eq. 17 is indicative of the tractor tire lateral force limit value $F_{TTR}$ for one wheel of the set of tractor wheels 18. As such, the on order to obtain the total tractor tire lateral force limit value $F_{TTR,total}$ in the tractor lateral direction $T_{TR}$, for each wheel of at least a subset of the set of tractor wheels 18, the following equation can be employed:

$$F_{TTR,total} = \sum_{j=1}^{M} F_{TTR,j} \quad \text{Eq. 18}$$

Wherein the index j indicates the j:th wheel and M the number of wheels in the subset of the set of tractor wheels 18. As a non-limiting example, the above-mentioned subset may be identical to the set of tractor wheels 18 such that M indicates the number of wheels in the set of tractor wheels 18.

Moreover, as indicated in FIG. 3*b*, the wheel has a wheel vertical direction $V_W$ being perpendicular to each one of the wheel longitudinal direction $L_W$ and the wheel transversal direction $T_W$. Moreover, though purely by way of example, the feature of determining the sliding threshold value $\sigma_{sl}$ may comprise using at least the following:

- A contact value $I_a$ proportional to a distance, in the wheel longitudinal direction $L_W$, along which contact between the wheel and the ground supporting the tractor 12 is determined to be established. With reference to FIG. 3*b*, the contact value $I_a$ may as a non-limiting example equal half the above-mentioned distance. However, it is also envisaged that other variants of the contact value $I_a$ may be used.
- A stiffness value $c_p$ indicative of a stiffness coefficient of the tire of the wheel.
- A force value $F_{VW}$ indicative of a force, in the wheel vertical direction $V_W$, imparted on the wheel.
- The previously mentioned friction value $\mu$ indicative of the friction between the wheel and the ground supporting the tractor 12.

Purely by way of example, the above parameters may be used for determining the determining the sliding threshold value $\sigma_{sl}$ in accordance with the following:

$$\sigma_{sl} = \frac{3\mu F_{VW}}{2c_p I_a^2}. \quad \text{Eq. 19}$$

As regards the slip values $\sigma_{LW}$, $\sigma_{TW}$, see Eq. 10 and Eq. 11 hereinabove, these slip values $\sigma_{LW}$, $\sigma_{TW}$ may for instance be determined by a procedure comprising determining a longitudinal slip value $\kappa$, indicative of a slip in the wheel longitudinal direction $L_W$, using the wheel longitudinal velocity value $v_{LW}$ and a product obtained by multiplying the effective rolling radius $R_e$ of the wheel by an angular velocity value $\omega$ indicative of a current angular velocity of the wheel. Purely by way of example, the longitudinal slip value $\kappa$ may be determined in accordance with the following:

$$\kappa = \frac{R_e\omega - v_{LW}}{\max(|R_e\omega|, |v_{LW}|)}. \quad \text{Eq. 20}$$

As used herein, the effective rolling radius Re relates to the ratio of the linear velocity $v_{LW}$ of the wheel centre in the wheel longitudinal direction to the angular velocity $\omega$ of the wheel when no slipping occurs. The effective rolling radius $R_e$ is indicated in FIG. 3*b*. As may be gleaned from FIG. 3*b*, the effective rolling radius $R_e$ is between the forced height $R_h$ of the wheel, viz the smallest distance in the wheel vertical direction $V_W$ from the ground to the centre of the wheel, and the geometric radius $R_g$ of the wheel.

The effective rolling radius $R_e$ can be determined in a plurality of ways, e.g. by determining the above-mentioned ratio of the linear velocity $v_{LW}$ of the wheel centre in the wheel longitudinal direction to the angular velocity ω of the wheel when no slipping occurs during different driving conditions. Alternatively, the effective rolling radius can be determined by determining a tire contact angle θ, see FIG. 3*b*, i.e. the top angle of a triangle connecting the wheel centre and each one of a rearmost and forwardmost contact points between the tire and the ground supporting the tire and combining such a tire contact angle with the geometric radius of the wheel.

Moreover, the feature of determining the tractor tire lateral force limit value may further comprise determining a slip angle value α using the wheel longitudinal velocity value $v_{LW}$ and the wheel transversal velocity value $v_{TW}$, preferably by dividing the wheel transversal velocity value $v_{TW}$ by the wheel longitudinal velocity value $v_{LW}$, more preferred by calculating the arctangent for an argument corresponding to the ratio between the wheel transversal velocity value $v_{TW}$ and the wheel longitudinal velocity value $v_{LW}$ multiplied by minus one.

As such, though purely by way of example, the slip angle value α may be determined in accordance with the following:

$$\alpha = \arctan\left(-\frac{v_{TW}}{v_{LW}}\right). \quad \text{Eq. 21}$$

As a non-limiting example, the longitudinal slip value κ and the slip angle value α may be used for determining the slip value $\sigma_{LW}$, $\sigma_{TW}$ in each one of the wheel longitudinal direction Lw and the wheel transversal direction $T_W$ in accordance with the following:

$$\sigma_{LW} = \frac{\kappa}{\kappa+1} \text{ and} \quad \text{Eq. 22}$$

$$\sigma_{TW} = \frac{\tan(\alpha)}{\kappa+1}. \quad \text{Eq. 23}$$

The above presentation relates to the determination of the tractor tire lateral force limit value $F_{TTR}$, be it the tractor tire lateral force limit value for one wheel or the total tractor tire lateral force limit value $F_{TTR,total}$.

However, as has been intimated in e.g. Eq. 8 hereinabove, the method according to the present invention also uses a tractor lateral force value $$F_{TTR}^{tractor}$$

indicative of a tractor lateral force being or predicted to be imparted on the tractor 12. Implementations of features for determining the tractor lateral force value $$F_{TTR}^{tractor}$$

will be elaborated hereinbelow.

As such, the method of the first aspect of the invention comprises determining a tractor lateral force value $$F_{TTR}^{tractor},$$

indicative of a tractor lateral force being or predicted to be imparted on the tractor 12, using a tractor lateral force value determination procedure comprising:

obtaining a trailer mass value $m^{trailer}$ indicative of the current mass of the trailer 14;

obtaining a trailer operating value indicative of the current or predicted operating condition of the trailer 14;

determining an articulation angle value Ψ indicative of a current articulation angle between the tractor longitudinal direction $L_{TR}$ and the trailer longitudinal direction $L_{TL}$, and determining the tractor lateral force value $$F_{TTR}^{tractor}$$

using the trailer mass value $m^{trailer}$, the trailer operating value and the articulation angle value Ψ.

The above-mentioned procedure comprises obtaining a trailer mass value mass $m^{trailer}$ indicative of the current mass of the trailer 14. Purely by way of example, the trailer mass value mass $m^{trailer}$ may be determined using e.g. information from a ground engaging member suspension system (not shown) of the trailer 14. Instead of, or in addition to using information from a ground engaging member suspension system, information indicative of the dead weight of the trailer as well as the current weight of the cargo carried by the trailer 14 may be used.

Moreover, the above-mentioned tractor lateral force value determination procedure comprises determining an articulation angle value Ψ indicative of a current articulation angle between the tractor longitudinal direction $L_{TR}$ and the trailer longitudinal direction $L_{TL}$. Purely by way of example, the articulation angle value Ψ may be determined using an articulation angle sensor (not shown) of the vehicle combination 10. Purely by way of example, such a sensor may be hosted by the tractor 12. However, it is also envisaged that the articulation angle value Ψ may be determined without the need of an articulation angle sensor. To this end, reference is made to e.g. Eq. 38 hereinbelow.

Moreover, various parameters, as well as combinations of parameters thereof, can be used for the trailer operating value. This will be elaborated on further hereinbelow.

As may be realized from FIG. 2, the tractor lateral force value $$F_{TTR}^{tractor}$$

is an aggregate or a force $$F_{TTR}^{tractor,imp}$$

imparted on the tractor 12, in the tractor lateral direction $T_{TR}$, as such as well as the connection forces $$F_{L_{TL}}^{trailer2tractor}, F_{T_{TL}}^{trailer2tractor}$$

between the tractor 12 and the trailer 14. Purely by way of example, the force $$F_{T_{TR}}^{tractor,imp}$$

imparted on the tractor 12 as such may be a centrifugal force as will be explained further hereinbelow.

In a similar vein, the connection force $$F_{T_{TL}}^{trailer2tractor}$$

in the trailer lateral direction $T_{TL}$ may relate to a centrifugal force imparted on the trailer 14. On the other hand, the connection force $$F_{L_{TL}}^{trailer2tractor}$$

in the trailer longitudinal direction $L_{TL}$ may be related to the mass $m^{trailer}$ of the trailer 14 as well as the longitudinal acceleration of the trailer 14. This will also be elaborated on further hereinbelow.

As has been intimated above, in order to transform the connection forces $$F_{L_{TL}}^{trailer2tractor}, F_{T_{TL}}^{trailer2tractor}$$

to the tractor lateral direction $T_{TR}$, information indicative of the current articulation angle Ψ can be used in accordance with the following:

$$F_{T_{TR}}^{tractor} = F_{T_{TR}}^{tractor,imp} + F_{T_{TL}}^{trailer2tractor} \cdot \cos(\Psi) + F_{L_{TL}}^{trailer2tractor} \cdot \sin(\Psi) \quad \text{Eq. 24}$$

The connection forces $$F_{L_{TL}}^{trailer2tractor}, F_{T_{TL}}^{trailer2tractor}$$

in the trailer longitudinal direction $L_{TL}$ and the trailer transversal direction $T_{TL}$, respectively, may be transformed to a trailer lateral force value $$F_{T_{TR}}^{trailer2tractor},$$

indicative of the lateral force being or predicted to be imparted on the tractor in the tractor lateral direction $T_{TR}$, in accordance with the following:

$$F_{T_{TR}}^{trailer2tractor} = F_{T_{TL}}^{trailer2tractor} \cdot \cos(\Psi) + F_{L_{TL}}^{trailer2tractor} \cdot \sin(\Psi) \quad \text{Eq. 25}$$

Figure 4:
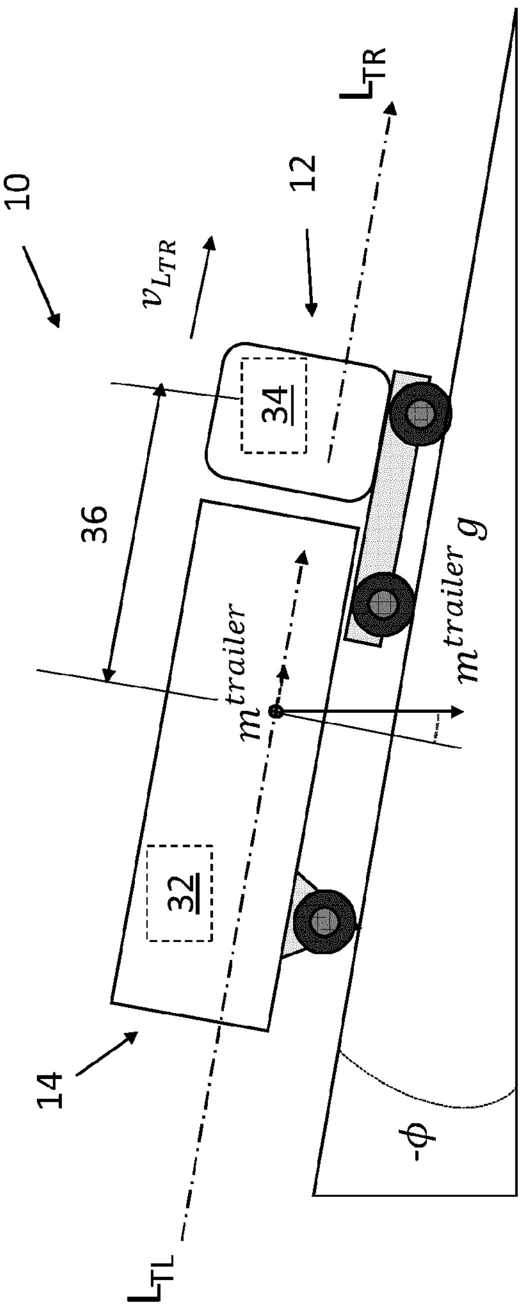
FIG. 4 is a schematic side view of a vehicle combination.

A first example of the trailer operating value may be a longitudinal trailer inclination angle value indicative of the inclination angle, in the trailer longitudinal direction $L_T$, of the ground supporting the trailer 14. To this end, reference is made to FIG. 4 illustrating a vehicle combination 10 travelling on a slope with an inclination angle—ϕ. As may be realized from FIG. 4, the inclination angle—ϕ will result in a gravity force imparted on the trailer 14 in the trailer longitudinal direction LIL and the gravity force will thus form part of the connection force $$F_{L_{TL}}^{trailer2tractor}$$

in the trailer longitudinal direction $L_{TL}$.

Thus, a first implementation of the above-mentioned tractor lateral force value determination procedure comprises obtaining a longitudinal trailer inclination angle value ϕ indicative of the inclination angle, in the trailer longitudinal direction $L_{TL}$, of the ground supporting the trailer 14. The inclination angle value ϕ may for instance be determined using an inclination sensor 32 of the trailer 14. Alternatively, the inclination angle value ϕ may be determined using information from a map system or the like. As such, using information concerning e.g. the topography of the ground using the map system as well as the current location of the trailer 14, which for instance may be determined using a global positioning system (not shown), the inclination angle value ϕ may be determined.

Moreover, the method comprises determining a longitudinal gravity force value $$F_{L_{TL}}^{trailer,gravity}$$

indicative or a longitudinal gravity force, in the trailer longitudinal direction $L_{TL}$, imparted on the trailer 14 on the basis of at least the trailer mass value $m^{trailer}$ and the longitudinal trailer inclination angle value ϕ. As a non-limiting example, the longitudinal gravity force value $$F_{L_{TL}}^{trailer,gravity}$$

may be determined in accordance with the following:

$$F_{L_{TL}}^{trailer,gravity} = g \cdot m^{trailer} \cdot \sin(\phi).$$

Moreover, a first implementation of the above-mentioned tractor lateral force value determination procedure comprises determining the tractor lateral force value $$F_{T_{TR}}^{tractor}$$

using the longitudinal gravity force value $$F_{L_{TL}}^{trailer,gravity}.$$

Purely by way of example, the above may be determined in accordance with the following:

$$F_{TR}^{tractor} = F_{L_{TL}}^{trailer,gravity} \cdot \sin(\Psi).$$

Purely by way of example, the trailer lateral force value determination procedure may further comprise obtaining a longitudinal trailer retardation value $r_{L_{TL}}$, indicative of a longitudinal trailer retardation being or predicted to be imparted on the trailer 14. As such, a second example of the trailer operating value may the above-mentioned longitudinal trailer retardation value $r_{L_{TL}}$.

Generally, the longitudinal trailer retardation value $r_{L_{TL}}$ may be negative, thus indicating a requested retardation, i.e. acceleration in a direction opposite to the trailer longitudinal direction $L_{TL}$. Purely by way of example, the longitudinal trailer retardation value $r_{L_{TL}}$ may be determined using a sensor (not shown) such as an accelerometer (not shown) associated with the trailer 14. However, it is also envisaged that the longitudinal trailer retardation value $r_{L_{TL}}$ may be determined in other ways, e.g. using a retardation request signal indicative of a requested retardation of the trailer 14.

Moreover, the trailer lateral force value determination procedure may comprise determining a longitudinal inertial trailer force value $$F_{L_{TL}}^{trailer,inertial}$$

indicative of a longitudinal inertial force, in the trailer lateral direction $L_{TL}$, imparted on the trailer 14 on the basis of at least the trailer mass value $m^{trailer}$ and the longitudinal trailer retardation value $r_{L_{TL}}$. Purely by way of example, the longitudinal inertial trailer force value $$F_{L_{TL}}^{trailer,inertial}$$

may be determined in accordance with the following:

$$F_{L_{TL}}^{trailer,inertial} = r_{L_{TL}} \cdot m^{trailer}.$$

As such, though purely by way of example, the longitudinal inertial trailer force value $$F_{L_{TL}}^{trailer,inertial}$$

and the longitudinal gravity force value $$F_{L_{TL}}^{trailer,gravity}$$

may be combined in order to form part of, or even constitute, the connection force $$F_{L_{TL}}^{trailer2tractor}$$

in the trailer longitudinal direction $L_{TL}$ in accordance with the following (see e.g. Eq. 25 hereinabove):

$$F_{L_{TL}}^{trailer2tractor} = F_{L_{TL}}^{trailer,gravity} + F_{L_{TL}}^{trailer,inertial}.$$

Furthermore, though purely by way of example, the trailer lateral force value determination procedure may further comprise:

determining a lateral centrifugal force value $$F_{T_{TL}}^{trailer,centrifugal}$$

indicative of a centrifugal force, in the trailer lateral direction $T_{TL}$, imparted on the trailer 14 on the basis of at least the trailer mass value $m^{trailer}$, and determining the trailer lateral force value $$F_{T_{TR}}^{trailer2tractor}$$

using lateral centrifugal force value $$F_{T_{TL}}^{trailer,centrifugal}.$$

Figure 6:
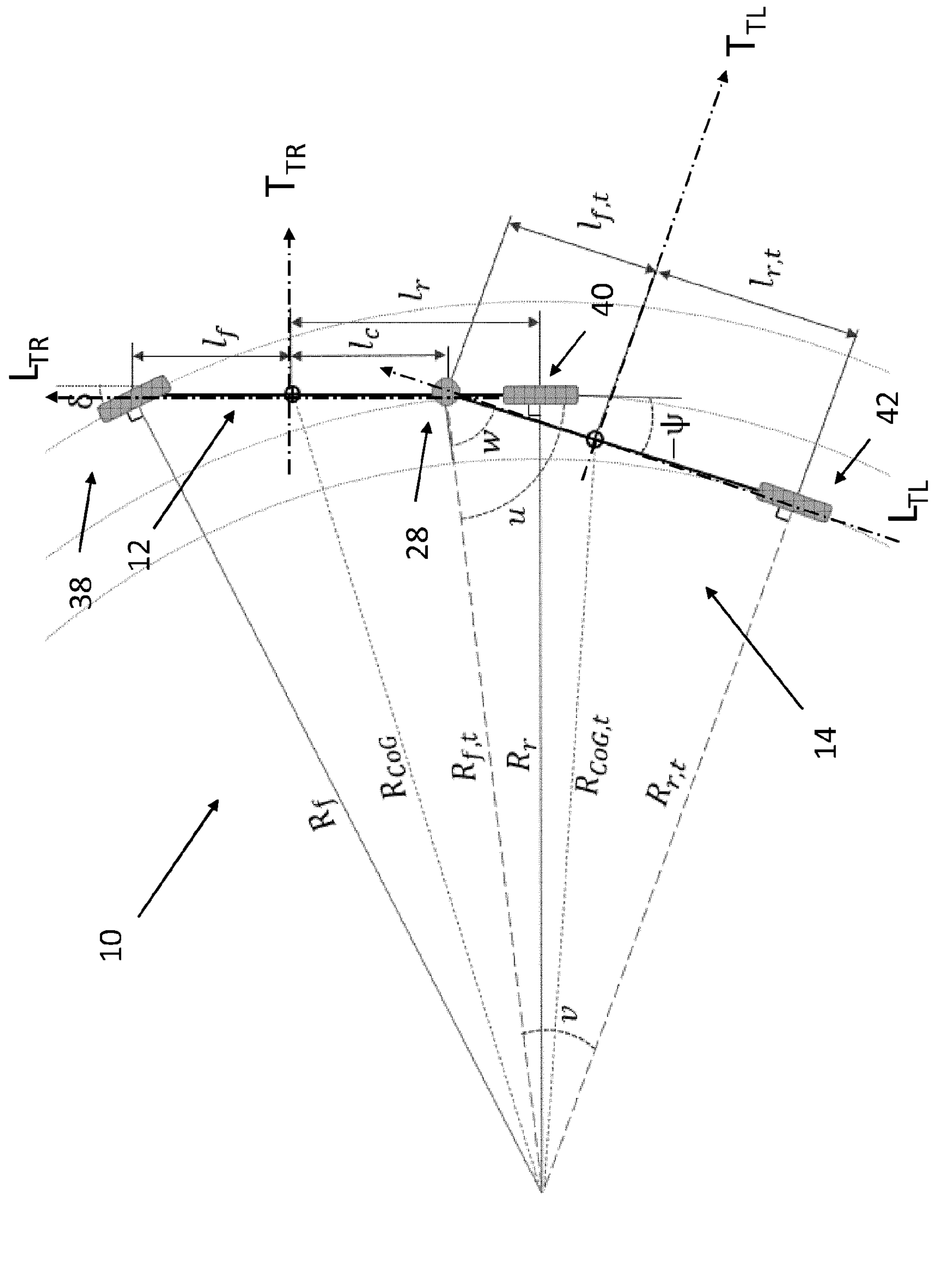
FIG. 6 is a schematic plan view of a vehicle combination.

Purely by way of example, the lateral centrifugal force value $$F_{T_{TL}}^{trailer,centrifugal}$$

may be determined on the basis of a longitudinal speed value $v_{L_{TL}}$, indicative of a speed of the trailer 14 in the trailer longitudinal direction $L_{TL}$ and a trailer curvature radius $R^{trailer}$, indicative of the radius of the curvature of a path that the centre of gravity of the trailer 14 currently is following (see FIG. 6). As a non-limiting example, the lateral centrifugal force value $$F_{T_{TL}}^{trailer,centrifugal}$$

may be determined in accordance with the following:

$$F_{T_{TL}}^{trailer,centrifugal} = m^{trailer} \frac{v_{L_{TL}}^2}{R^{trailer}} \quad \text{Eq. 26}$$

In a similar vein as for the lateral centrifugal force value $$F_{T_{TL}}^{trailer,centrifugal}$$

mentioned above, the force $$F_{T_{TR}}^{tractor,imp}$$

imparted on the tractor 12, in the tractor lateral direction $T_{TR}$, may comprise an addend relating to a lateral centrifugal force value $$F_{T_{TR}}^{tractor,centrifugal}$$

indicative of a centrifugal force, in the tractor lateral direction $T_{TR}$, imparted on the tractor 12 on the basis of at least the tractor mass value $m^{tractor}$, a longitudinal speed value $v_{L_{TR}}$ indicative of a speed of the tractor 12 in the tractor longitudinal direction $L_{TR}$ and a tractor curvature radius $R^{tractor}$, indicative of the radius of the curvature of a path that the centre of gravity of the tractor 12 currently is following. Thus, in analogy with Eq. 26 hereinabove, the lateral centrifugal force value $$F_{T_{TR}}^{tractor,centrifugal}$$

for the tractor 12 may be determined in accordance with the following:

$$F_{T_{TR}}^{tractor,centrifugal} = m^{tractor}\frac{v_{L_{TR}}^2}{R^{tractor}} \quad \text{Eq. 27}$$

In embodiments of the present invention, the longitudinal speed value $v_{L_{TR}}$ indicative of a speed of the tractor 12 in the tractor longitudinal direction $L_{TR}$ may be determined using a speed sensor (not shown) of the tractor 12. Moreover, though purely by way of example, in embodiments of the present invention the longitudinal speed value $v_{L_{TL}}$ indicative of a speed of the trailer 14 in the trailer longitudinal direction $L_{TL}$ may be set so as to equal the longitudinal speed value $v_{L_{TR}}$ indicative of a speed of the tractor 12 in the tractor longitudinal direction $L_{TR}$.

Going back to the lateral centrifugal force value of the trailer 14, though purely by way of example, the lateral centrifugal force value $$F_{T_{TL}}^{trailer,centrifugal}$$

for the trailer 14 may form part of, or even constitute, the connection force $$F_{T_{TL}}^{trailer2tractor}$$

in the trailer lateral direction $T_{TL}$ in accordance with the following (see e.g. Eq. 25 hereinabove):

$$F_{T_{TL}}^{trailer2tractor} C\cdot F_{T_{TL}}^{trailer,centrifugal}. \quad \text{Eq. 28}$$

It should be noted that that only a portion of the lateral centrifugal force value $$F_{T_{TL}}^{trailer,centrifugal}$$

may be added to the trailer lateral force value $$F_{T_{TR}}^{trailer2tractor}.$$

As such, the factor C in Eq. 28 hereinabove may be within the range of 0 to 1. Here, it should be noted that the ground engaging members of the trailer 14 may accommodate a portion of the lateral centrifugal force imparted on the trailer 14. As such, though purely by way of example, the portion of the lateral centrifugal force that will be imparted on the connection point 28 may be determined by means of a moment equilibrium equation taking the distance, in the trailer longitudinal direction $L_{TL}$, between the ground engaging members of the trailer 14 and the centre of gravity of the trailer, as well as the distance, in the trailer longitudinal direction $L_{TL}$, between the connection point 28 and the centre of gravity of the trailer 14 into account. To this end, reference is made to Eq. 46 hereinbelow presenting an example of how the above-mentioned distances may be taken into account.

Figure 5:
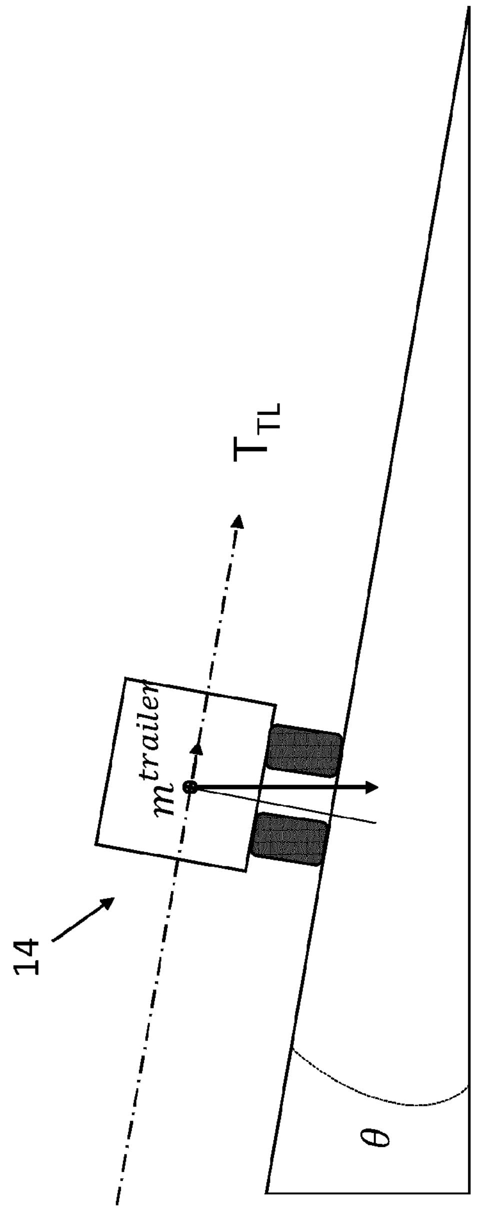
FIG. 5 is a schematic rear view of a vehicle combination.

However, it should also be noted that, though purely by way of example, the trailer lateral force value determination procedure may further comprise obtaining a lateral inclination angle value θ indicative of the inclination angle, in the trailer lateral direction $T_{TL}$, of the ground supporting the trailer 14. To this end, reference is made to FIG. 5 illustrating an implementation of a trailer 14 located on a transversally inclined slope.

As such, though purely by way of example, the trailer lateral force value determination procedure may comprise determining a lateral gravity force value $$F_{T_{TL}}^{trailer,gravity}$$

indicative of a lateral gravity force, in the trailer lateral direction $T_{TL}$, imparted on the trailer 14 on the basis of at least the trailer mass value $m^{trailer}$ and the lateral inclination angle value θ. Moreover, the procedure may further comprise determining the trailer lateral force value using the lateral gravity force value $$F_{T_{TL}}^{trailer,gravity}.$$

As such, though purely by way of example, Eq. 28 hereinabove may be extended in accordance with the following:

$$F_{T_{TL}}^{trailer2tractor} = C\cdot\left(F_{T_{TL}}^{trailer,centrifugal} + F_{T_{TL}}^{trailer,gravity}\right). \quad \text{Eq. 29}$$

Again, the factor C in Eq. 29 may be within the range of 0 to 1 and may relate to the distances, in the trailer longitudinal direction $L_{TL}$, between the ground engaging members of the trailer 14, the centre of gravity of the trailer 14, and the connection point 28. As has been indicated hereinabove with reference to Eq. 24 for example, the trailer lateral force value determination procedure may further comprise multiplying each force value indicative of a force, in the trailer longitudinal direction $L_{TL}$, with the sine of the articulation angle value Ψ. In a similar vein, again with reference to Eq. 24 for example, the trailer lateral force value determination procedure may further comprise multiplying each force value indicative of a force, in the trailer lateral direction $T_{TL}$, with the cosine of the articulation angle value $\Psi$.

As has been intimated above, the longitudinal trailer inclination angle value $\phi$ may for instance be determined using an inclination sensor 32 of the trailer 14. However, alternatively, the longitudinal trailer inclination angle value $\phi$ may be determined using an inclination sensor 34 hosted by the tractor 12 as will be elaborated on hereinbelow. As such, the tractor 12 may comprise an inclination sensor 34, adapted to determine a longitudinal tractor inclination angle value $\phi'$ indicative of the inclination angle, in the tractor longitudinal direction $L_{TR}$, of the ground supporting the tractor 12. Moreover, with reference to FIG. 4, obtaining the longitudinal trailer inclination angle value $\phi$ indicative of the inclination angle, in the trailer longitudinal direction $L_{TL}$, of the ground supporting the trailer 14 may comprise:

- Obtaining a speed value $v_{L_{TR}}$ indicative of a current speed of the tractor 12 in the tractor longitudinal direction $L_{TR}$.
- Obtaining a distance value 36 indicative of a distance, in the tractor longitudinal direction $L_{TR}$, between the inclination sensor 34 and a reference point of the trailer 14. Purely by way of example, and as indicated in FIG. 4, the reference point may be the centre of gravity of the trailer 14.
- Using the speed value $v_{L_{TR}}$, and the distance value 36 for determining an elapsed time $\Delta t$ from a first time instant $t_1$ at which the inclination sensor 34 is located at a certain global position and a second time instant $t_2$ at which the reference point of the trailer is located at the same global position.
- Determining the longitudinal trailer inclination angle value $\phi$ using one or more longitudinal tractor inclination angle values $\phi'$ determined by the inclination sensor 34 as well as the elapsed time $\Delta t$.

As has been intimated hereinabove, the above examples are generally based on Eq. 3 such that the methods are carried on a tractor level. However, as has been intimated above, e.g. with reference to Eq. 4, embodiments may also be performed on a ground engaging member axle level. As such, when a tractor 12 comprises a set of wheel axles, wherein said set of wheel axles comprises at least one wheel axle and wherein each wheel axle is connected to individual wheels of said set of tractor wheels, the method according to the first aspect of the present invention may comprise performing the following for each wheel axle in the set of wheel axles:

on the basis of the trailer lateral force value $$F_{T_{TR}}^{trailer2tractor},$$

determining a trailer axle lateral force value $$F_{T_{TR}}^{trailer2tractor,axle}$$

indicative or a trailer lateral force being or predicted to be imparted on the wheel axle;

- determining a tractor axle lateral force limit value using a tire model for determining a tire lateral force limit, taking at least one characteristic of the tire into account, for at least one, preferably each of, the wheel or wheels connected to the wheel axle;
- determining a reference axle lateral force value using the trailer axle lateral force value and the tractor axle lateral force limit value;
- determining a horizontal axle friction force value indicative of a possible total horizontal frictional force obtainable between the ground supporting the tractor 12 and at least one, preferably each of, the wheel or wheels connected to the wheel axle, and
- determining a tractor axle longitudinal force threshold value using the reference axle lateral force value and the horizontal axle friction force value, and summarizing the axle tractor longitudinal force threshold value $$F_{L_{TR}}^{ret,threshold,axle}$$

for each wheel axle in the set of wheel axles in order to obtain the tractor longitudinal force threshold value $$F_{L_{TR}}^{ret,threshold}.$$

Furthermore, though purely by way of example, the step of determining the trailer axle lateral force value $$F_{T_{TR}}^{trailer2tractoraxle}$$

indicative or a trailer lateral force being or predicted to be imparted on the wheel axle on the on the basis of the trailer lateral force value $$F_{T_{TR}}^{trailer2tractor}$$

may comprise using a moment equilibrium equation using the following inputs:

- the trailer lateral force value $$F_{T_{TR}}^{trailer2tractor};$$

- a distance $l_f$, $l_r$, in the tractor longitudinal direction $L_{TR}$, from each wheel axle to the centre of gravity of the tractor 12, and
- a distance $l_c$, in the tractor longitudinal direction $L_{TR}$, from the connection point 28 to the centre of gravity of the tractor 12.

In a similar vein, though purely by way of example, embodiments may also be performed on a wheel level. As such, embodiments of the present invention may comprise performing the following for at least a plurality, preferably for each one, of the wheels of the set of set of tractor wheels 18:

on the basis of the trailer lateral force value $$F_{T_{TR}}^{trailer2tractor},$$

determining a trailer wheel lateral force value $$F_{T_{TR}}^{trailer2tractor,wheel}$$

indicative of a trailer lateral force being or predicted to be imparted on the wheel;

- determining a tractor wheel lateral force limit value using a tire model for determining a tire lateral force limit, taking at least one characteristic of the tire into account, for the wheel;
- determining a reference wheel lateral force value using the trailer wheel lateral force value and the tractor wheel lateral force limit value;
- determining a horizontal wheel friction force value indicative of a possible total horizontal frictional force obtainable between the ground supporting the tractor and at least one, preferably each of, the wheel or wheels connected to the wheel, and
- determining a tractor wheel longitudinal force threshold value using the reference wheel lateral force value and the horizontal wheel friction force value, and summarizing the wheel tractor longitudinal force threshold value $$F_{L_{TR}}^{ret,threshold,wheel}$$

for each wheel in the set of wheel wheels in order to obtain the tractor longitudinal force threshold value $$F_{L_{TR}}^{ret,threshold}.$$

Furthermore, though purely by way of example, the step of determining the trailer wheel lateral force value $$F_{T_{TR}}^{trailer2tractor,\ wheel}$$

indicative of a trailer lateral force being or predicted to be imparted on the wheel on the on the basis of the trailer lateral force value $$F_{T_{TR}}^{trailer2tractor}$$

may comprise using a moment equilibrium equation using the following inputs:

- the trailer lateral force value $$F_{T_{TR}}^{trailer2tractor};$$

- a distance $l_f$, $l_r$, in the tractor longitudinal direction $L_{TR}$, from each one of a plurality of wheels, preferably from each wheel, in the set of tractor wheels 18 to the centre of gravity of the tractor 12, and
- a distance $l_c$, in the tractor longitudinal direction $L_{TR}$, from the connection point 28 to the centre of gravity of the tractor 12.

It is also envisaged that embodiments of the present invention may use combinations of the above indicated wheel axle level approach and the wheel level approach. Purely by way of example, it is conceived that embodiments of the present invention may use the wheel axle level approach for certain axles of a tractor and the wheel level approach for the remaining wheels of the set of tractor wheels 18.

Irrespective of how the tractor longitudinal force threshold value $$F_{L_{TR}}^{ret,\ threshold}$$

has been determined, it is preferably used in a method for braking a vehicle combination 10 comprising a tractor 12 and a trailer 14. The tractor comprises a tractor brake assembly for regenerative braking of the tractor and the trailer comprises a trailer brake assembly for braking the trailer.

The method comprises:

- determining a tractor longitudinal force threshold value $$F_{L_{TR}}^{ret,\ threshold}$$

using the method according to the first aspect of the present invention, for instance in accordance with any one of the embodiments presented hereinabove, and

- operating the tractor brake assembly so as to provide a braking force being smaller than or equal to the tractor longitudinal force threshold value $$F_{L_{TR}}^{ret,\ threshold}.$$

As a non-limiting example, the method for braking a vehicle combination 10 may further comprise:

- obtaining a retardation request value Treg indicative of a requested retardation of the vehicle combination 10;
- determining a requested braking force $F^{ret,request}$ to be imparted on the vehicle combination 10 on the basis of the retardation request value $r_{req}$, and
- in response to the requested braking force $F^{ret,request}$ being smaller than or equal to the force tractor longitudinal force threshold value $$F_{L_{TR}}^{ret,\ threshold},$$

operating the tractor brake assembly but not the trailer brake assembly for braking the vehicle combination 10.

The requested braking force $F^{ret,request}$ may be determined in a plurality of different ways. However, as a non-limiting example, determining a requested braking force $F^{ret,request}$ to be imparted on the vehicle combination 10 on the basis of the retardation request value $r_{req}$ may comprise obtaining a tractor mass value $m^{tractor}$ indicative of the current mass of the tractor and a trailer mass value $m^{trailer}$ indicative of the current mass of the trailer. Purely by way of example, the requested braking force $$F_{L_{TR}}^{ret,\,request}$$

may be expressed as a force in the tractor longitudinal direction $L_{TR}$ and may be determined in accordance with the following:

$$F_{L_{TR}}^{ret,\,request} = \left(m^{tractor} + m^{trailer}\right) \cdot r_{L_{TL}} + F_{L_{TR}}^{resistance}.$$

The force term $$F_{L_{TR}}^{resistance}$$

may relate to resistance from e.g. drag forces imparted on the vehicle combination 10.

Moreover, determining the requested braking force $F^{ret,\,request}$ to be imparted on the vehicle combination 10 on the basis of the retardation request value $r_{req}$ may further comprise determining a longitudinal trailer inclination angle value indicative of the inclination angle, in the trailer longitudinal direction, of the ground supporting the trailer.

Optionally, determining a requested braking force to be imparted on the vehicle combination on the basis of the retardation request value further may comprise determining a longitudinal tractor inclination angle value indicative of the inclination angle, in the tractor longitudinal direction, of the ground supporting the tractor.

FIG. 6 is a schematic plan view of a vehicle combination 10 comprising a tractor 12 and a trailer 14. In the specific embodiment of the vehicle combination illustrated in FIG. 6, the tractor 12 comprises two sets of wheels, viz a front set of wheels 38 and a rear set of wheels 40. Purely by way of example, the front set of wheels 38 may be steerable, and may thus have a variable steering angle δ, but the rear set of wheels 40 need not necessarily be steerable.

The implementation of the trailer 14 illustrated in FIG. 6 comprises a set of wheels 42 and the trailer 14 is pivotally connected to the tractor 12 via a connection point 28. Moreover, FIG. 6 indicates the following distances:

- $l_f$ being the distance, in the tractor longitudinal direction $L_{TR}$, from the front set of wheels 38 to the centre of gravity of the tractor 12;
- $l_r$ being the distance, in the tractor longitudinal direction $L_{TR}$, from the rear set of wheels 40 to the centre of gravity of the tractor 12;
- $l_c$ being the distance, in the tractor longitudinal direction $L_{TR}$, from the connection point 28 to the centre of gravity of the tractor 12;
- $l_{f,t}$ being the distance, in the trailer longitudinal direction $L_{TL}$, from the connection point 28 to the centre of gravity of the trailer 14;
- $l_{r,t}$ being the distance, in the trailer longitudinal direction $L_{TL}$, from the connection point 28 to the set of wheels 42 of the trailer 14;
- $R_f$ being the turning radius of the front set of wheels 38;
- $R_r$ being the turning radius of the rear set of wheels 40;
- $R_{f,t}$ being the turning radius of the connection point 28, and
- $R_{r,t}$ being the turning radius of the set of wheels 42 of the trailer 14.

Purely by way of example, the above distances may be known (for instance furnished by the supplier of the tractor 12 and the trailer 14) and the steering angle δ may be determined using a steering angle sensor (not shown). Using the above distances $l_f$, $l_r$, $l_c$, $l_{f,t}$ and $l_{r,t}$ as well as a value indicative of the steering angle δ, the above-mentioned turning radii as well as the previously mentioned articulation angle Ψ can be determined in accordance with the following set of equations:

$$R_f = \frac{(l_f + l_r)}{\sin|\delta|} \quad \text{Eq. 30}$$

$$R_r = \frac{(l_f + l_r)}{\tan|\delta|} \quad \text{Eq. 31}$$

$$R_{f,t} = \sqrt{R_r^2 + (l_r - l_c)^2} \quad \text{Eq. 32}$$

$$R_{r,t} = \sqrt{R_{f,t}^2 - (l_{f,t} + l_{r,t})^2} \quad \text{Eq. 33}$$

$$R_{CoG} = \sqrt{R_r^2 + l_r^2} \quad \text{Eq. 34}$$

$$R_{CoG,t} = \sqrt{R_{r,t}^2 + l_{r,t}^2} \quad \text{Eq. 35}$$

$$u = \tan^{-1}\left(\frac{R_{r,t}}{l_{f,t} + l_{r,t}}\right) \quad \text{Eq. 36}$$

$$w = \tan^{-1}\left(\frac{R_{r,t}}{l_r - l_c}\right) \quad \text{Eq. 37}$$

$$\psi = -\text{sign}(\delta)(w - u) \quad \text{Eq. 38}$$

When the tractor 12 has a certain speed $v_{L_{TR}}$, in the tractor longitudinal direction $L_{TR}$, the trailer 14 has a certain speed $v_{L_{TL}}$, in the trailer longitudinal direction $L_{TL}$, the previously mentioned longitudinal trailer retardation value $r_{L_{TL}}$, indicative of a longitudinal trailer retardation being or predicted to be imparted on the trailer 14 has been obtained and the trailer 14 is travelling on a slope with an inclination angle ϕ, the tractor lateral force value $$F_{T_{TR}}^{tractor}$$

—presented for each axle of FIG. 6 tractor—can be determined in accordance with the following of the FIG. 6 embodiment:

$$F_{L_{TR}}^{requested} = \left(m^{tractor} + m^{trailer}\right) \cdot r_{L_{TL}} + F_{L_{TR}}^{resistance} \quad \text{Eq. 39}$$

$$F_{T_{TR}}^{tractor,\,centrifugal} = m^{tractor}\frac{v_{L_{TR}}^2}{R_{CoG}} \quad \text{Eq. 40}$$

$$F_{T_{TL}}^{trailer,\,centrifugal} = m^{trailer}\frac{v_{L_{TL}}^2}{R_{CoG,\,t}} \quad \text{Eq. 41}$$

$$F_{L_{TL}}^{trailer,\,inertial} = m^{trailer} \cdot r_{L_{TL}} \quad \text{Eq. 42}$$

$$F_{L_{TL}}^{trailer,\,gravity} = m^{trailer} \cdot g \cdot \sin(\theta) \quad \text{Eq. 43}$$

$$F_{T_{TR}}^{tractor,\,centrifugal,\,front} = F_{T_{TR}}^{tractor,\,centrifugal}\frac{l_r}{l_r + l_f} \quad \text{Eq. 44}$$

$$F_{T_{TR}}^{tractor,\,centrifugal,\,rear} = F_{T_{TR}}^{tractor,\,centrifugal}\frac{l_f}{l_r + l_f} \quad \text{Eq. 45}$$

$$F_{T_{TL}}^{trailer,\,centrifugal,\,cp} = F_{T_{TL}}^{trailer,\,centrifugal}\frac{l_{r,\,t}}{l_{f,\,t} + l_{r,\,t}} \quad \text{Eq. 46}$$

$$F_{T_{TR}}^{trailer2tractor,\,total} = F_{T_{TL}}^{trailer,\,centrifugal,\,cp}\cos\psi + \left(F_{L_{TL}}^{trailer,\,inertial} + F_{L_{TL}}^{trailer,\,gravity}\right)\sin\psi \quad \text{Eq. 47}$$

-continued $$F_{T_{TR}}^{trailer2tractor,\,total,\,front} = F_{T_{TR}}^{trailer2tractor,\,total} \frac{l_r - l_c}{l_f + l_r} \quad \text{Eq. 48}$$

$$F_{T_{TR}}^{trailer2tractor,\,total,\,rear} = F_{T_{TR}}^{trailer2tractor,\,total} \frac{l_f + l_c}{l_f + l_r} \quad \text{Eq. 49}$$

$$F_{T_{TR}}^{tractor,\,total,\,front} = F_{T_{TR}}^{tractor,\,centrifugal,\,front} + F_{T_{TR}}^{trailer2tractor,\,total,\,front} \quad \text{Eq. 50}$$

$$F_{T_{TR}}^{tractor,\,total,\,rear} = F_{T_{TR}}^{tractor,\,centrifugal,\,rear} + F_{T_{TR}}^{trailer2tractor,\,total,\,rear} \quad \text{Eq. 51}$$

In the above equations, the superscript "front" indicates forces associated with the front set of wheels 38, the superscript "rear" indicates forces associated with the rear set of wheels 40 of the tractor 12 and the superscript "cp" indicates forces associated with the connection point 28.

The above equations and FIG. 6 are related to a vehicle combination 10 comprising a tractor 12 having two set of wheels 38, 40 and a trailer 14 having one set of wheels 42. However, the above equations Eq. 30 to Eq. 51 can of course be expanded to any number of set of wheels of each one of the tractor 12 and the trailer 14.

Although the present invention has been presented in relation to methods, it should be noted that the above disclosure is equally applicable to each one of the following:

a computer program comprising program code means for performing the method of the first or second aspects of the invention when the program is run on a computer;

a computer readable medium carrying a computer program comprising program code means for performing the method of the first or second aspects of the invention when the program product is run on a computer;

a control unit 30 configured to perform the method according to the first or second aspects of the invention;

a vehicle combination comprising a tractor 12, a trailer 14 and a control unit 30 according to the above.

It is to be understood that the present invention is not limited to the embodiments described above and illustrated in the drawings; rather, the skilled person will recognize that many changes and modifications may be made within the scope of the appended claims.

The invention claimed is:

1. A method for braking a vehicle combination comprising a tractor and a trailer, said tractor comprises a tractor brake assembly for regenerative braking of said tractor and said trailer comprising a trailer brake assembly for braking said trailer, said method comprising:

determining a tractor longitudinal force threshold value $$\left(F_{L_{TR}}^{ret,threshold}\right)$$

for a tractor longitudinal retardation force $$\left(F_{L_{TR}}^{ret}\right)$$

that can be imparted on the tractor of the vehicle combination, said trailer having a trailer longitudinal extension in a trailer longitudinal direction ($L_{TL}$), a trailer lateral extension in a trailer lateral direction ($T_{TL}$) and a trailer vertical extension in a trailer vertical direction ($V_{TL}$), wherein said trailer longitudinal direction ($L_{TL}$) corresponds to an intended direction of travel of said trailer when said vehicle combination is travelling straight ahead, said trailer vertical direction ($V_{TL}$) corresponds to a direction of a normal to a planar surface supporting the trailer and said trailer lateral direction ($T_{TL}$) being perpendicular to each one of said trailer longitudinal direction (LTL) and said trailer vertical direction ($V_{TL}$), said tractor having a tractor longitudinal extension in a tractor longitudinal direction ($L_{TR}$), a tractor lateral extension in a tractor lateral direction ($T_{TR}$) and a tractor vertical extension in a tractor vertical direction ($V_{TR}$), wherein said tractor longitudinal direction ($L_{TR}$) corresponds to an intended direction of travel of said tractor when said vehicle combination is travelling straight ahead, said tractor vertical direction ($V_{TR}$) corresponds to a direction of a normal to a planar surface supporting the tractor and said tractor lateral direction ($T_{TR}$) being perpendicular to each one of said tractor longitudinal direction (LTR) and said tractor vertical direction ($V_{TR}$), wherein said tractor longitudinal retardation force $$\left(F_{L_{TR}}^{ret}\right)$$

parallel to said tractor longitudinal direction ($L_{TR}$), said tractor comprising a set of tractor wheels adapted to engage the ground supporting said tractor, each wheel of said set of tractor wheels comprising a tire, wherein determining the tractor longitudinal force threshold value comprises:

determining a tractor lateral force value $$\left(F_{T_{TR}}^{tractor}\right),$$

indicative of a tractor lateral force being or predicted to be imparted on said tractor, using a tractor lateral force value determination procedure comprising:

obtaining a trailer mass value ($m^{trailer}$) indicative of a current mass of said trailer;

obtaining a trailer operating value indicative of a current operating condition or a predicted operating condition of said trailer;

determining an articulation angle value ($\Psi$) indicative of a current articulation angle between said tractor longitudinal direction ($L_{TR}$) and said trailer longitudinal direction ($L_{TL}$), and determining said tractor lateral force value $$\left(F_{T_{TR}}^{tractor}\right)$$

using said trailer mass value ($m^{trailer}$), said trailer operating value and said articulation angle value ($\Psi$);

determining a tractor tire lateral force limit value ($F_{T_{TR}}^{tire}$) using a tire model for determining a tire lateral force limit, taking at least one characteristic of the tire into account, for each wheel of at least a subset of said set of tractor wheels;

determining a reference lateral force value $$\left(F_{T_{TR}}^{tractor,ref}\right)$$

using said tractor lateral force value $$\left(F_{T_{TR}}^{tractor}\right)$$

and said tractor tire lateral force limit value ($F_{T_{TR}}{}^{tire}$);

determining a horizontal friction force value $$\left(F_{total}^{tractor}\right)$$

indicative of a possible total horizontal frictional force obtainable between said ground supporting said tractor and said set of tractor wheels, and determining said tractor longitudinal force threshold value $$\left(F_{L_{TR}}^{ret,threshold}\right)$$

using said reference lateral force value $$\left(F_{T_{TR}}^{tractor,ref}\right)$$

and said horizontal friction force value $$\left(F_{total}^{tractor}\right),$$

wherein said method for braking said vehicle combination comprises operating said tractor brake assembly so as to provide a braking force being smaller than or equal to said tractor longitudinal force threshold value $$\left(F_{L_{TR}}^{ret,threshold}\right).$$

2. The method according to claim 1, wherein each wheel of the set of tractor wheels has a wheel longitudinal direction ($L_W$) being parallel to said tractor longitudinal direction ($L_{TR}$) when said vehicle combination is travelling straight ahead, wherein each wheel of the set of tractor wheels has a wheel transversal direction ($T_W$) being parallel to said tractor lateral direction ($T_{TR}$) when said vehicle combination is travelling straight ahead, wherein determining said tractor tire lateral force limit value $$\left(F_{T_{TR}}^{tire}\right)$$

comprises the following for each wheel of at least said subset of said set of tractor wheels:

determining a wheel longitudinal velocity value ($V_{Lw}$) indicative of a velocity in said wheel longitudinal direction ($L_W$) of said wheel, determining a wheel transversal velocity value ($V_{Tw}$) indicative of a velocity in said wheel transversal direction ($T_W$) of said wheel, determining a sliding threshold value ($\sigma_{sl}$), indicative of a sliding threshold above which said wheel is expected to slide relative to the ground supporting said tractor, and using said wheel longitudinal velocity value ($V_{Lw}$), said wheel transversal velocity value ($V_{Tw}$) and said sliding threshold value ($\sigma_{sl}$) for determining a wheel specific tractor tire lateral force limit value portion forming part of said tractor tire lateral force limit value $$\left(F_{T_{TR}}^{tire}\right).$$

3. The method according to claim 2, wherein said wheel has a wheel vertical direction ($V_W$) being perpendicular to each one of said wheel longitudinal direction ($L_W$) and said wheel transversal direction ($T_W$), wherein determining said sliding threshold value comprises using at least the following:

a contact value ($l_a$) proportional to a distance, in said wheel longitudinal direction, along which contact between said wheel and the ground supporting said tractor is determined to be established;

a stiffness value ($c_p$) indicative of a stiffness coefficient of the tire of said wheel;

a vertical force value ($F_{VW}$) indicative of a force, in said wheel vertical direction ($V_W$), imparted on said wheel, and a friction value ($\mu$) indicative of the friction between the wheel and the ground supporting said tractor.

4. The method according to claim 2, wherein determining said tractor tire lateral force limit value further comprises the following for each wheel of at least said subset of said set of tractor wheels:

determining a longitudinal slip value ($\kappa$), indicative of a slip in said wheel longitudinal direction ($L_W$), using said wheel longitudinal velocity value ($v_{Lw}$) and a product obtained by multiplying an effective rolling radius ($R_e$) of said wheel by an angular velocity value ($\omega$) indicative of a current angular velocity of said wheel.

5. The method according to claim 2, wherein determining said tractor tire lateral force limit value further comprises the following for each wheel of at least said subset of said set of tractor wheels:

determining a slip angle value ($\alpha$) using said wheel longitudinal velocity value ($v_{LW}$) and said wheel transversal velocity value ($v_{TW}$).

6. The method according to claim 1, wherein determining said reference lateral force value $$\left(F_{T_{TR}}^{tractor,ref}\right)$$

using said tractor lateral force value $$\left(F_{T_{TR}}^{tractor}\right)$$

and said tractor tire lateral force limit value $$\left(F_{T_{TR}}^{tire}\right)$$

comprises setting said reference lateral force value to equal the one of said tractor lateral force value and said tractor tire lateral force limit value having the largest absolute value.

7. The method according to claim 1, wherein said tractor lateral force value determination procedure further comprises:

obtaining a longitudinal trailer inclination angle value (ϕ) indicative of an inclination angle, in said trailer longitudinal direction, of the ground supporting said trailer;

determining a longitudinal gravity force value $$\left(F_{L_{TL}}^{trailer,gravity}\right)$$

indicative of a longitudinal gravity force, in said trailer longitudinal direction, imparted on said trailer on the basis of at least said trailer mass value and said longitudinal trailer inclination angle value, and determining said tractor lateral force value $$\left(F_{T_{TR}}^{tractor}\right)$$

using said longitudinal gravity force value $$\left(F_{L_{TL}}^{trailer,gravity}\right).$$

8. The method according to claim 1, wherein said tractor lateral force value determination procedure further comprises:

obtaining a longitudinal trailer retardation value ($r_{L_{TL}}$) indicative of a longitudinal trailer retardation being or predicted to be imparted on said trailer;

determining a longitudinal inertial force value $$\left(F_{L_{TL}}^{trailer,inertial}\right)$$

indicative or a longitudinal inertial force, in said trailer lateral direction, imparted on said trailer on the basis of at least said trailer mass value ($m^{trailer}$) and said longitudinal trailer retardation value ($r_{L_{TL}}$), and determining said tractor lateral force value $$\left(F_{T_{TR}}^{tractor}\right)$$

using said longitudinal inertial force value $$\left(F_{L_{TL}}^{trailer,inertial}\right).$$

9. The method according to claim 1, wherein said tractor lateral force value determination procedure further comprises:

determining a lateral centrifugal force value $$\left(F_{T_{TL}}^{trailer,centrifugal}\right)$$

indicative or a centrifugal force, in said trailer lateral direction ($T_{TL}$), imparted on said trailer on the basis of at least said trailer mass value ($m^{trailer}$), and determining said tractor lateral force value $$\left(F_{T_{TR}}^{tractor}\right)$$

using said lateral centrifugal force value $$\left(F_{T_{TL}}^{trailer,centrifugal}\right).$$

10. The method according to claim 1, wherein said tractor lateral force value determination procedure further comprises:

obtaining a lateral inclination angle value (θ) indicative of an inclination angle, in said trailer lateral direction, of the ground supporting said trailer;

determining a lateral gravity force value $$\left(F_{T_{TL}}^{trailer,gravity}\right)$$

indicative of a lateral gravity force, in said trailer lateral direction, imparted on said trailer on the basis of at least said trailer mass value ($m^{trailer}$) and said lateral inclination angle value (θ), and determining said tractor lateral force value $$\left(F_{T_{TR}}^{tractor}\right)$$

using said lateral gravity force value $$\left(F_{T_{TL}}^{trailer,gravity}\right).$$

11. The method according to claim 1, wherein said method comprises determining a trailer lateral force value $$\left(F_{T_{TR}}^{trailer2tractor}\right)$$

indicative of the trailer lateral force being or predicted to be imparted on the tractor in the tractor lateral direction, wherein said tractor comprises a set of wheel axles, wherein said set of wheel axles comprises at least one wheel axle and wherein each wheel axle is connected to a plurality of individual wheels of said set of tractor wheels, wherein said method comprises performing the following for each wheel axle in said set of wheel axles:

on the basis of said trailer lateral force value $$\left(F_{T_{TR}}^{trailer2tractor}\right),$$

determining a trailer axle lateral force value $$\left(F_{T_{TR}}^{trailer2tractor,axle}\right)$$

indicative of a trailer lateral force being or predicted to be imparted on said wheel axle;

determining a tractor axle lateral force limit value using said tire model for determining a tire lateral force limit, taking at least one characteristic of the tire into account, for at least one of the wheel or wheels connected to said wheel axle;

determining a reference axle lateral force value using said trailer axle lateral force value and said tractor axle lateral force limit value;

determining a horizontal axle friction force value indicative of a possible total horizontal frictional force obtainable between said ground supporting said tractor and at least one of the wheel or wheels connected to said wheel axle;

determining a tractor axle longitudinal force threshold value using said reference axle lateral force value and said horizontal axle friction force value, and determining said tractor longitudinal force threshold value $$\left(F_{L_{TR}}^{ret,threshod}\right)$$

by summing the axle tractor longitudinal force threshold value $$\left(F_{L_{TR}}^{ret,threshold,axle}\right)$$

over all wheel axles in said set of wheel axles $$F_{L_{TR}}^{ret,threshold}.$$

12. The method according to claim 11, wherein the step of determining said trailer axle lateral force value $$\left(F_{T_{TR}}^{trailer2tractor,axle}\right)$$

indicative or said trailer lateral force being or predicted to be imparted on said wheel axle on the on the basis of said trailer lateral force value $$\left(F_{T_{TR}}^{trailer2tractor}\right)$$

comprises using a moment equilibrium equation using the following inputs:

said trailer lateral force value $$\left(F_{T_{TR}}^{trailer2tractor}\right);$$

a distance ($l_f$, $l_r$), in the tractor longitudinal direction ($L_{TR}$), from each wheel axle to a centre of gravity of said tractor, and a distance ($l_c$), in the tractor longitudinal direction ($L_{TR}$), from a connection point to the centre of gravity of the tractor.

13. The method according to claim 1, wherein said method comprises determining a trailer lateral force value indicative of the trailer lateral force being or predicted to be imparted on the tractor in the tractor lateral direction, wherein said method comprises performing the following for at least a plurality of the wheels of said set of tractor wheels:

on the basis of said trailer lateral force value $$\left(F_{T_{TR}}^{trailer2tractor}\right),$$

determining a trailer wheel lateral force value $$\left(F_{T_{TR}}^{trailer2tractor,wheel}\right)$$

indicative of a trailer lateral force being or predicted to be imparted on said wheel;

determining a tractor wheel lateral force limit value using said tire model for determining a tire lateral force limit, taking at least one characteristic of the tire into account, for said wheel;

determining a reference wheel lateral force value using said trailer wheel lateral force value and said tractor wheel lateral force limit value;

determining a horizontal wheel friction force value indicative of a possible total horizontal frictional force obtainable between said ground supporting said tractor and at least one of the wheel or wheels of said set of tractor wheels;

determining a tractor wheel longitudinal force threshold value using said reference wheel lateral force value and said horizontal wheel friction force value, and determining said tractor longitudinal force threshold value $$\left(F_{L_{TR}}^{ret,threshold}\right)$$

by summing the wheel tractor longitudinal force threshold values $$\left(F_{L_{TR}}^{ret,threshold,wheel}\right)$$

over all wheels in said set of wheels.

14. The method according to claim 13, wherein said method comprises determining a trailer lateral force value indicative of the trailer lateral force being or predicted to be imparted on the tractor in the tractor lateral direction, wherein the step of determining said trailer wheel lateral force value $$\left(F_{T_{TR}}^{trailer2tractor,wheel}\right)$$

indicative of said trailer lateral force being or predicted to be imparted on said wheel on the basis of said trailer lateral force value $$\left(F_{T_{TR}}^{trailer2tractor}\right)$$

comprises using a moment equilibrium equation using the following inputs:

said trailer lateral force value $$\left(F_{T_{TR}}^{trailer2tractor}\right);$$

a distance ($l_f$, $l_r$), in the tractor longitudinal direction ($L_{TR}$), from each one of a plurality of wheels in said set of tractor wheels to a centre of gravity of said tractor, and a distance ($l_c$), in the tractor longitudinal direction ($L_{TR}$), from a connection point to the centre of gravity of the tractor.

15. The method according to claim 1, wherein said method further comprises:

obtaining a retardation request value ($r_{req}$) indicative of a requested retardation of said vehicle combination;

determining a requested braking force ($F^{ret,request}$) to be imparted on said vehicle combination on the basis of said retardation request value ($r_{req}$);

in response to said braking force ($F^{ret,request}$) being smaller than or equal to said tractor longitudinal force threshold value $$\left(F_{L_{TR}}^{ret,threshold}\right),$$

operating said tractor brake assembly but not said trailer brake assembly for braking said vehicle combination.

16. The method according to claim 15, wherein determining the requested braking force to be imparted on said vehicle combination on the basis of said retardation request value further comprises obtaining the tractor mass value ($m^{tractor}$) indicative of a current mass of said tractor and a trailer mass value ($m^{trailer}$) indicative of a current mass of said trailer.

17. The method according to claim 15, wherein determining the requested braking force to be imparted on said vehicle combination on the basis of said retardation request value ($r_{req}$) further comprises determining a longitudinal trailer inclination angle value ($\phi$) indicative of an inclination angle, in said trailer longitudinal direction, of the ground supporting said trailer.

* * * * *